United States Patent
Yang et al.

(10) Patent No.: US 9,887,812 B2
(45) Date of Patent: *Feb. 6, 2018

(54) METHOD FOR TRANSMITTING CONTROL INFORMATION AND APPARATUS THEREFOR

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR); Mingyu Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,795

(22) Filed: Jan. 17, 2017

(65) Prior Publication Data

US 2017/0126370 A1    May 4, 2017

Related U.S. Application Data

(63) Continuation of application No. 14/321,274, filed on Jul. 1, 2014, now Pat. No. 9,584,298, which is a
(Continued)

(51) Int. Cl.
*H04L 12/28* (2006.01)
*H04L 1/18* (2006.01)
(Continued)

(52) U.S. Cl.
CPC .......... *H04L 1/1861* (2013.01); *H04L 1/0026* (2013.01); *H04L 1/0031* (2013.01);
(Continued)

(58) Field of Classification Search
USPC ........................................ 370/252, 278, 282
See application file for complete search history.

(56) References Cited

U.S. PATENT DOCUMENTS

| | | | |
|---|---|---|---|
| 2009/0129335 A1 | 5/2009 | Lee et al. | |
| 2012/0087254 A1* | 4/2012 | Yin | ...................... H04L 1/0031 370/252 |

(Continued)

FOREIGN PATENT DOCUMENTS

| | | |
|---|---|---|
| CN | 101361309 A | 2/2009 |
| CN | 101465720 A | 6/2009 |

(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 9)", 3GPP TS 36.212 V9.2.0, Jun. 2010, pp. 1-62.

(Continued)

*Primary Examiner* — John Pezzlo
(74) *Attorney, Agent, or Firm* — Birch, Stewart, Kolasch & Birch, LLP

(57) ABSTRACT

A method is presented for transmitting uplink control information in a wireless communication system supporting carrier aggregation and operating in Time Division Duplex (TDD). The method includes transmitting 4 bits (o(0), o(1), o(2), o(3)) for hybrid automatic repeat request acknowledgements (HARQ-ACKs) on a physical uplink shared channel (PUSCH). The 4 bits correspond to a first set of HARQ-ACKs associated with a first component carrier (CC) and a second set of HARQ-ACKs associated with a second CC according to a relation.

12 Claims, 14 Drawing Sheets

Related U.S. Application Data continuation of application No. 14/119,786, filed as application No. PCT/KR2012/004122 on May 24, 2012, now Pat. No. 8,855,027.

(60) Provisional application No. 61/489,655, filed on May 24, 2011.

(51) Int. Cl.

| | | |
|---|---|---|
| *H04L 5/00* | (2006.01) | |
| *H04L 1/00* | (2006.01) | |
| *H04L 5/14* | (2006.01) | |
| *H04W 72/04* | (2009.01) | |
| *H04L 1/16* | (2006.01) | |
| *H04J 1/16* | (2006.01) | |

(52) U.S. Cl.
CPC .......... *H04L 1/0057* (2013.01); *H04L 1/0073* (2013.01); *H04L 1/1607* (2013.01); *H04L 5/001* (2013.01); *H04L 5/0055* (2013.01); *H04L 5/14* (2013.01); *H04W 72/042* (2013.01); *H04W 72/0413* (2013.01)

(56) References Cited

U.S. PATENT DOCUMENTS

| | | |
|---|---|---|
| 2012/0134305 A1 | 5/2012 | Damnjanovic et al. |
| 2012/0207109 A1 | 8/2012 | Pajukoski et al. |
| 2012/0213187 A1 | 8/2012 | Yang et al. |
| 2013/0148613 A1 | 6/2013 | Han et al. |
| 2013/0322398 A1 | 12/2013 | Jang et al. |
| 2015/0237611 A1* | 8/2015 | Ahn .................. H04W 72/0406 370/329 |
| 2015/0358127 A1* | 12/2015 | Seo ....................... H04L 1/1861 370/329 |
| 2017/0251477 A1* | 8/2017 | Chung .............. H04W 72/0453 |

FOREIGN PATENT DOCUMENTS

| | | |
|---|---|---|
| WO | WO 2010/087641 A2 | 8/2010 |
| WO | WO 2010/105680 A1 | 9/2010 |
| WO | WO 2010/148319 A1 | 12/2010 |
| WO | WO 2011/041623 A1 | 4/2011 |
| WO | WO 2011/052961 A2 | 5/2011 |

OTHER PUBLICATIONS

Fujitsu, "Channel Selection for A/N feedback in CA", 3GPP TSG-RAN1 #62, Madrid, Spain, Aug. 23-27, 2010, R1-104875, pp. 1-5.

Huawei et al., "Determination of Pusch A/N codebook size for TDD", 3GPP TSG RAN WG1 Meeting #65, R1-112010, Barcelona, Spain, May 9-13, 2011, 14 pages.

LG Electronics, "Correction to table for TDD mode b with M=2", 3GPP TSG-RAN WG1, Meeting #65, R1-111617, Barcelona, Spain, May 9-13, 2011, 7 pages.

Samsung, "HARQ-ACK Multiplexing in PUSCH for "mode a" and "mode b" in TDD", 3GPP TSG RAN WG1#65, R1-111454, Barcelona, Spain, May 9-13, 2011, 6 pages.

\* cited by examiner

METHOD FOR TRANSMITTING CONTROL INFORMATION AND APPARATUS THEREFOR

CROSS-REFERENCE TO RELATED APPLICATIONS

This Application is a Continuation of U.S. patent application Ser. No. 14/321,274 filed on Jul. 1, 2014 (now U.S. Pat. No. 9,584,298 issued on Feb. 28, 2017), which is a Continuation of U.S. patent application Ser. No. 14/119,786 filed on Nov. 22, 2013 (now U.S. Pat. No. 8,855,027 issued on Oct. 7, 2014), which is filed as the National Phase of PCT/KR2012/004122 filed on May 24, 2012, which claims the benefit under 35 U.S.C. §119(e) to U.S. Provisional Application No. 61/489,655 filed on May 24, 2011, all of which are hereby expressly incorporated by reference into the present application.

BACKGROUND OF THE INVENTION

Field of the Invention

The present invention relates to a wireless communication system and, more specifically, to a method for transmitting control information and an apparatus for the same.

Discussion of the Related Art

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

SUMMARY OF THE INVENTION

An object of the present invention devised to solve the problem lies in a method for efficiently transmitting control information in a wireless communication system and an apparatus for the same. Another object of the present invention is to provide a method and apparatus for efficiently transmitting uplink control information in a time division duplexing (TDD) system and efficiently managing resources for the same. The technical problems solved by the present invention are not limited to the above technical problems and those skilled in the art may understand other technical problems from the following description.

The object of the present invention can be achieved by providing a method for transmitting uplink control information in a wireless communication system supporting carrier aggregation and operating in TDD, the method including: generating a first set of hybrid automatic repeat request acknowledgements (HARQ-ACKs) associated with a first component carrier (CC); generating a second set of HARQ-ACKs associated with a second CC; and transmitting 4-bit information corresponding to the first set of HARQ-ACKs and the second set of HARQ-ACKs on a physical uplink shared channel (PUSCH), wherein correspondence between the first set of HARQ-ACKs, the second set of HARQ-ACKs and the 4-bit information is given using the following relationship:

| First CC<br>HARQ-ACK(0),<br>HARQ-ACK(1),<br>HARQ-ACK(2) | Second CC<br>HARQ-ACK(0),<br>HARQ-ACK(1),<br>HARQ-ACK(2) | 4-bit information<br>o(0), o(1),<br>o(2), o(3) |
|---|---|---|
| A, A, A | A, A, A | 1, 1, 1, 1 |
| A, A, N/D | A, A, A | 1, 0, 1, 1 |
| A, N/D, any | A, A, A | 0, 1, 1, 1 |
| N/D, any, any | A, A, A | 0, 0, 1, 1 |
| A, A, A | A, A, N/D | 1, 1, 1, 0 |
| A, A, N/D | A, A, N/D | 1, 0, 1, 0 |
| A, N/D, any | A, A, N/D | 0, 1, 1, 0 |
| N/D, any, any | A, A, N/D | 0, 0, 1, 0 |
| A, A, A | A, N/D, any | 1, 1, 0, 1 |
| A, A, N/D | A, N/D, any | 1, 0, 0, 1 |
| A, N/D, any | A, N/D, any | 0, 1, 0, 1 |
| N/D, any, any | A, N/D, any | 0, 0, 0, 1 |
| A, A, A | N/D, any, any | 1, 1, 0, 0 |
| A, A, N/D | N/D, any, any | 1, 0, 0, 0 |
| A, N/D, any | N/D, any, any | 0, 1, 0, 0 |
| N, any, any | N/D, any, any | 0, 0, 0, 0 |
| D, any, any | N/D, any, any | 0, 0, 0, 0 | wherein A denotes ACK, N denotes NACK (negative ACK), D denotes DTX (discontinuous transmission), N/D denotes NACK or DTX, and any represents one of ACK, NACK and DTX.

CC may be replaceable by a cell.

In another aspect of the present invention, provided herein is a communication device configured to transmit uplink control information in a wireless communication system supporting carrier aggregation and operating in TDD, including: a radio frequency (RF) unit; and a processor, wherein the processor is configured to generate a first set of HARQ-ACKs associated with a first CC, to generate a second set of HARQ-ACKs associated with a second CC and to transmit 4-bit information corresponding to the first set of HARQ-ACKs and the second set of HARQ-ACKs on a PUSCH, wherein correspondence between the first set of HARQ-ACKs, the second set of HARQ-ACKs and the 4-bit information is given using the following relationship:

| First CC<br>HARQ-ACK(0),<br>HARQ-ACK(1),<br>HARQ-ACK(2) | Second CC<br>HARQ-ACK(0),<br>HARQ-ACK(1),<br>HARQ-ACK(2) | 4-bit information<br>o(0), o(1),<br>o(2), o(3) |
|---|---|---|
| A, A, A | A, A, A | 1, 1, 1, 1 |
| A, A, N/D | A, A, A | 1, 0, 1, 1 |
| A, N/D, any | A, A, A | 0, 1, 1, 1 |
| N/D, any, any | A, A, A | 0, 0, 1, 1 |
| A, A, A | A, A, N/D | 1, 1, 1, 0 |
| A, A, N/D | A, A, N/D | 1, 0, 1, 0 |
| A, N/D, any | A, A, N/D | 0, 1, 1, 0 |
| N/D, any, any | A, A, N/D | 0, 0, 1, 0 |
| A, A, A | A, N/D, any | 1, 1, 0, 1 |
| A, A, N/D | A, N/D, any | 1, 0, 0, 1 |
| A, N/D, any | A, N/D, any | 0, 1, 0, 1 |
| N/D, any, any | A, N/D, any | 0, 0, 0, 1 |
| A, A, A | N/D, any, any | 1, 1, 0, 0 |
| A, A, N/D | N/D, any, any | 1, 0, 0, 0 |
| A, N/D, any | N/D, any, any | 0, 1, 0, 0 |
| N, any, any | N/D, any, any | 0, 0, 0, 0 |
| D, any, any | N/D, any, any | 0, 0, 0, 0 | wherein A denotes ACK, N denotes NACK (negative ACK), D denotes DTX (discontinuous transmission), N/D denotes NACK or DTX, and any represents one of ACK, NACK and DTX.

CC may be replaceable by a cell. The first CC may be a primary CC and the second CC may be a secondary CC.

When a physical downlink shared channel (PDSCH) without a physical downlink control channel (PDCCH) corresponding thereto is detected in the first CC or the second CC, HARQ-ACK(0) in the corresponding HARQ-ACK set may represent an ACK/NACK/DTX response to the PDSCH without a PDCCH corresponding thereto, wherein HARQ-ACK(j) in the corresponding HARQ-ACK set represents an ACK/NACK/DTX response to a PDSCH corresponding to a PDCCH having a DAI (downlink assignment index) of j or an ACK/NACK/DTX response to an SPS (semi-persistent scheduling) release PDCCH having a DAI of j.

When a PDSCH without a PDCCH corresponding thereto is not detected, HARQ-ACK(j) in each HARQ-ACK set may represent an ACK/NACK/DTX response to a PDSCH corresponding to a PDCCH having a DAI j+1 or an ACK/NACK/DTX response to an SPS release PDCCH having a DAI of j+1.

Transmission of the 4-bit information on the PUSCH may include channel-coding the 4-bit information using $$q_i^{ACK} = \sum_{n=0}^{3} (o_n \cdot M_{(i\,mod\,32),n}) \bmod 2$$

wherein $q_i^{ACK}$ denotes an i-th channel-coded bit, i denotes an integer equal to or greater than 0, mod represents a modulo operation and $M_{a,n}$ represents the following block code:

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0  | 1 | 1 | 0 | 0 | 0 | 0 | 0 | 0 | 0 | 0 | 1 |
| 1  | 1 | 1 | 1 | 0 | 0 | 0 | 0 | 0 | 0 | 1 | 1 |
| 2  | 1 | 0 | 0 | 1 | 0 | 0 | 1 | 0 | 1 | 1 | 1 |
| 3  | 1 | 0 | 1 | 1 | 0 | 0 | 0 | 0 | 1 | 0 | 1 |
| 4  | 1 | 1 | 1 | 1 | 0 | 0 | 0 | 1 | 0 | 0 | 1 |
| 5  | 1 | 1 | 0 | 0 | 1 | 0 | 1 | 1 | 1 | 0 | 1 |
| 6  | 1 | 0 | 1 | 0 | 1 | 0 | 1 | 0 | 1 | 1 | 1 |
| 7  | 1 | 0 | 0 | 1 | 1 | 0 | 0 | 1 | 1 | 0 | 1 |
| 8  | 1 | 1 | 0 | 1 | 1 | 0 | 0 | 1 | 0 | 1 | 1 |
| 9  | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | □ | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

In another aspect of the present invention, provided herein is a method for transmitting uplink control information in a wireless communication system supporting carrier aggregation and operating in TDD, including: generating a first set of HARQ-ACKs associated with a first CC; generating a second set of HARQ-ACKs associated with a second CC; and transmitting 4-bit information corresponding to the first set of HARQ-ACKs and the second set of HARQ-ACKs on a PUSCH, wherein correspondence between the first set of HARQ-ACKs, the second set of HARQ-ACKs and the 4-bit information is given using the following relationship:

| First CC HARQ-ACK(0), HARQ-CK(1), HARQ-ACK(2), HARQ-ACK(3) | Second CC HARQ-ACK(0), HARQ-CK(1), HARQ-ACK(2), HARQ-ACK(3) | 4-bit information o(0), o(1), o(2), o(3) |
|---|---|---|
| A, A, A, N/D | A, A, A, N/D | 1, 1, 1, 1 |
| A, A, N/D, any | A, A, A, N/D | 1, 0, 1, 1 |
| A, D, D, D | A, A, A, N/D | 0, 1, 1, 1 |
| A, A, A, A | A, A, A, N/D | 0, 1, 1, 1 |
| N/D, any, any, any | A, A, A, N/D | 0, 0, 1, 1 |
| (A, N/D, any, any), except for (A, D, D, D) | A, A, A, N/D | 0, 0, 1, 1 |
| A, A, A, N/D | A, A, N/D, any | 1, 1, 1, 0 |
| A, A, N/D, any | A, A, N/D, any | 1, 0, 1, 0 |
| A, D, D, D | A, A, N/D, any | 0, 1, 1, 0 |
| A, A, A, A | A, A, N/D, any | 0, 1, 1, 0 |
| N/D, any, any, any | A, A, N/D, any | 0, 0, 1, 0 |
| (A, N/D, any, any), except for (A, D, D, D) | A, A, N/D, any | 0, 0, 1, 0 |
| A, A, A, N/D | A, D, D, D | 1, 1, 0, 1 |
| A, A, A, N/D | A, A, A, A | 1, 1, 0, 1 |
| A, A, N/D, any | A, D, D, D | 1, 0, 0, 1 |
| A, A, N/D, any | A, A, A, A | 1, 0, 0, 1 |
| A, D, D, D | A, D, D, D | 0, 1, 0, 1 |
| A, D, D, D | A, A, A, A | 0, 1, 0, 1 |
| A, A, A, A | A, D, D, D | 0, 1, 0, 1 |
| A, A, A, A | A, A, A, A | 0, 1, 0, 1 |
| N/D, any, any, any | A, D, D, D | 0, 0, 0, 1 |
| N/D, any, any, any | A, A, A, A | 0, 0, 0, 1 |
| (A, N/D, any, any), except for (A, D, D, D) | A, D, D, D | 0, 0, 0, 1 |
| (A, N/D, any, any), except for (A, D, D, D) | A, A, A, A | 0, 0, 0, 1 |
| A, A, A, N/D | N/D, any, any, any | 1, 1, 0, 0 |
| A, A, A, N/D | (A, N/D, any, any), except for (A, D, D, D) | 1, 1, 0, 0 |
| A, A, N/D, any | N/D, any, any, any | 1, 0, 0, 0 |
| A, A, N/D, any | (A, N/D, any, any), except for (A, D, D, D) | 1, 0, 0, 0 |
| A, D, D, D | N/D, any, any, any | 0, 1, 0, 0 |
| A, D, D, D | (A, N/D, any, any), except for (A, D, D, D) | 0, 1, 0, 0 |
| A, A, A, A | N/D, any, any, any | 0, 1, 0, 0 |
| A, A, A, A | (A, N/D, any, any), except for (A, D, D, D) | 0, 1, 0, 0 |
| N, any, any, any | N/D, any, any, any | 0, 0, 0, 0 |
| N, any, any, any | (A, N/D, any, any), except for (A, D, D, D) | 0, 0, 0, 0 |
| (A, N/D, any, any), except for (A, D, D, D) | N/D, any, any, any | 0, 0, 0, 0 |
| (A, N/D, any, any), except for (A, D, D, D) | (A, N/D, any, any), except for (A, D, D, D) | 0, 0, 0, 0 |
| D, any, any, any | N/D, any, any, any | 0, 0, 0, 0 |
| D, any, any, any | (A, N/D, any, any), except for (A, D, D, D) | 0, 0, 0, 0 | wherein A denotes ACK, N denotes NACK (negative ACK), D denotes DTX (discontinuous transmission), N/D denotes NACK or DTX, and any represents one of ACK, NACK and DTX.

CC may be replaceable by a cell.

In another aspect of the present invention, provided herein is a communication device configured to transmit uplink control information in a wireless communication system supporting carrier aggregation and operating in TDD, including: a radio frequency (RF) unit; and a processor, wherein the processor is configured to generate a first set of HARQ-ACKs associated with a first CC, to generate a second set of HARQ-ACKs associated with a second CC and to transmit 4-bit information corresponding to the first set of HARQ-ACKs and the second set of HARQ-ACKs on a PUSCH, wherein correspondence between the first set of HARQ-ACKs, the second set of HARQ-ACKs and the 4-bit information is given using the following relationship:

| First CC HARQ-ACK(0), HARQ-ACK(1), HARQ-ACK(2), HARQ-ACK(3) | Second CC HARQ-ACK(0), HARQ-ACK(1), HARQ-ACK(2), HARQ-ACK(3) | 4-bit information o(0), o(1), o(2), o(3) |
|---|---|---|
| A, A, A, N/D | A, A, A, N/D | 1, 1, 1, 1 |
| A, A, N/D, any | A, A, A, N/D | 1, 0, 1, 1 |
| A, D, D, D | A, A, A, N/D | 0, 1, 1, 1 |
| A, A, A, A | A, A, A, N/D | 0, 1, 1, 1 |
| N/D, any, any, any | A, A, A, N/D | 0, 0, 1, 1 |
| (A, N/D, any, any), except for (A, D, D, D) | A, A, A, N/D | 0, 0, 1, 1 |
| A, A, A, N/D | A, A, N/D, any | 1, 1, 1, 0 |
| A, A, N/D, any | A, A, N/D, any | 1, 0, 1, 0 |
| A, D, D, D | A, A, N/D, any | 0, 1, 1, 0 |
| A, A, A, A | A, A, N/D, any | 0, 1, 1, 0 |
| N/D, any, any, any | A, A, N/D, any | 0, 0, 1, 0 |
| (A, N/D, any, any), except for (A, D, D, D) | A, A, N/D, any | 0, 0, 1, 0 |
| A, A, A, N/D | A, D, D, D | 1, 1, 0, 1 |
| A, A, A, N/D | A, A, A, A | 1, 1, 0, 1 |
| A, A, N/D, any | A, D, D, D | 1, 0, 0, 1 |
| A, A, N/D, any | A, A, A, A | 1, 0, 0, 1 |
| A, D, D, D | A, D, D, D | 0, 1, 0, 1 |
| A, D, D, D | A, A, A, A | 0, 1, 0, 1 |
| A, A, A, A | A, D, D, D | 0, 1, 0, 1 |

-continued

| First CC HARQ-ACK(0), HARQ-ACK(1), HARQ-ACK(2), HARQ-ACK(3) | Second CC HARQ-ACK(0), HARQ-ACK(1), HARQ-ACK(2), HARQ-ACK(3) | 4-bit information o(0), o(1), o(2), o(3) |
|---|---|---|
| A, A, A, A | A, A, A, A | 0, 1, 0, 1 |
| N/D, any, any, any | A, D, D, D | 0, 0, 0, 1 |
| N/D, any, any, any | A, A, A, A | 0, 0, 0, 1 |
| (A, N/D, any, any), except for (A, D, D, D) | A, D, D, D | 0, 0, 0, 1 |
| (A, N/D, any, any), except for (A, D, D, D) | A, A, A, A | 0, 0, 0, 1 |
| A, A, A, N/D | N/D, any, any, any | 1, 1, 0, 0 |
| A, A, A, N/D | (A, N/D, any, any), except for (A, D, D, D) | 1, 1, 0, 0 |
| A, A, N/D, any | N/D, any, any, any | 1, 0, 0, 0 |
| A, A, N/D, any | (A, N/D, any, any), except for (A, D, D, D) | 1, 0, 0, 0 |
| A, D, D, D | N/D, any, any, any | 0, 1, 0, 0 |
| A, D, D, D | (A, N/D, any, any), except for (A, D, D, D) | 0, 1, 0, 0 |
| A, A, A, A | N/D, any, any, any | 0, 1, 0, 0 |
| A, A, A, A | (A, N/D, any, any), except for (A, D, D, D) | 0, 1, 0, 0 |
| N, any, any, any | N/D, any, any, any | 0, 0, 0, 0 |
| N, any, any, any | (A, N/D, any, any), except for (A, D, D, D) | 0, 0, 0, 0 |
| (A, N/D, any, any), except for (A, D, D, D) | N/D, any, any, any | 0, 0, 0, 0 |
| (A, N/D, any, any), except for (A, D, D, D) | (A, N/D, any, any), except for (A, D, D, D) | 0, 0, 0, 0 |
| D, any, any, any | N/D, any, any, any | 0, 0, 0, 0 |
| D, any, any, any | (A, N/D, any, any), except for (A, D, D, D) | 0, 0, 0, 0 | wherein A denotes ACK, N denotes NACK (negative ACK), D denotes DTX (discontinuous transmission), N/D denotes NACK or DTX, and any represents one of ACK, ACK and DTX.

CC may be replaceable by a cell.

The first CC may be a primary CC and the second CC may be a secondary CC.

When a PDSCH without a PDCCH corresponding thereto is detected in the first CC or the second CC, HARQ-ACK(0) in the corresponding HARQ-ACK set may represent an ACK/NACK/DTX response to the PDSCH without a PDCCH corresponding thereto, wherein HARQ-ACK(j) in the corresponding HARQ-ACK set represents an ACK/NACK/DTX response to a PDSCH corresponding to a PDCCH having a DAI of j or an ACK/NACK/DTX response to an SPS release PDCCH having a DAI of j.

When a PDSCH without a PDCCH corresponding thereto is not detected, HARQ-ACK(j) in each HARQ-ACK set may represent an ACK/NACK/DTX response to a PDSCH corresponding to a PDCCH having a DAI j+1 or an ACK/NACK/DTX response to an SPS release PDCCH having a DAI of j+1.

Transmission of the 4-bit information on the PUSCH may include channel-coding the 4-bit information using $$q_i^{ACK} = \sum_{n=0}^{3} (o_n \cdot M_{(i\,mod\,32),n}) \bmod 2$$

wherein $q_i^{ACK}$ denotes an i-th channel-coded bit, i denotes an integer equal to or greater than 0, mod represents a modulo operation and $M_{a,n}$ represents the following block code:

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 1 | 0 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |

-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

According to the present invention, it is possible to efficiently transmit control information in a wireless communication system. Specifically, it is possible to efficiently transmit uplink control information in a TDD system and efficiently manage resources for the same.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

DETAILED DESCRIPTION OF THE INVENTION

Figure 1:
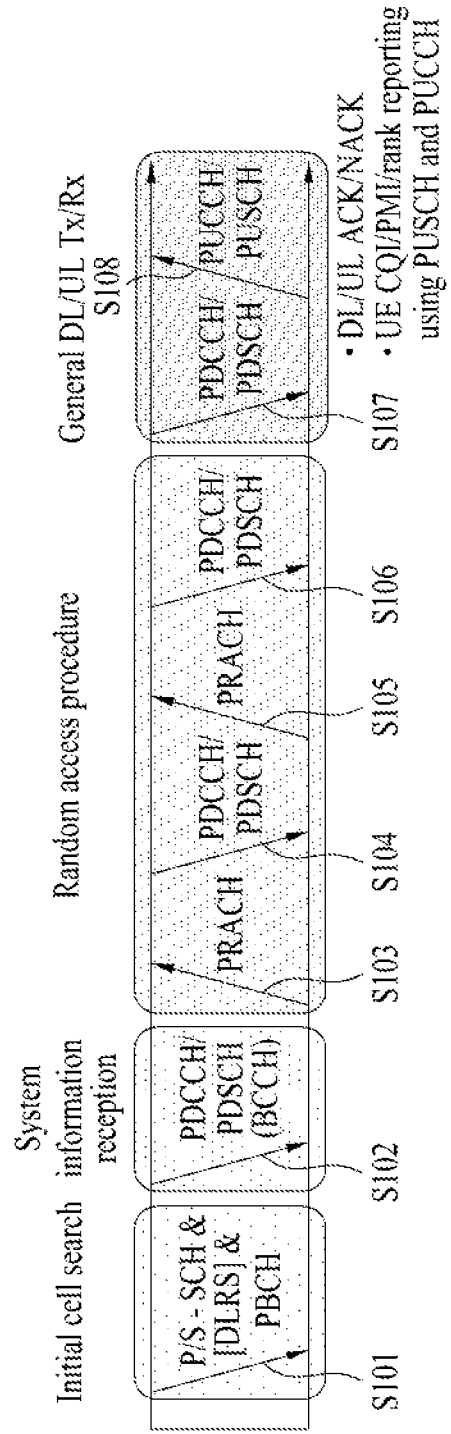
FIG. 1 illustrates physical channels used in a 3GPP LTE system as an exemplary wireless communication system and a signal transmission method using the same.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

The terms used in the specification are described.

HARQ-ACK (Hybrid Automatic Repeat request-Acknowledgement): this represents an acknowledgment response to downlink transmission (e.g. PDSCH or SPS release PDCCH), that is, an ACK/NACK/DTX response (simply, ACK/NACK response, ACK/NACK). The ACK/NACK/DTX response refers to ACK, NACK, DTX or NACK/DTX. HARQ-ACK for a specific CC or HARQ-ACK of a specific CC refers to an ACK/NACK response to a downlink signal (e.g. PDSCH) related to (e.g. scheduled for) the corresponding CC. A PDSCH can be replaced by a transport block (TB) or a codeword.

PDSCH: this corresponds to a DL grant PDCCH. The PDSCH is used interchangeably with a PDSCH w/PDCCH in the specification.

SPS release PDCCH: this refers to a PDCCH indicating SPS release. A UE performs uplink feedback of ACK/NACK information about an SPS release PDCCH.

SPS PDSCH: this is a PDSCH transmitted on DL using a resource semi-statically set according to SPS. The SPS PDSCH has no DL grant PDCCH corresponding thereto. The SPS PDSCH is used interchangeably with a PDSCH w/o PDCCH in the specification.

PUCCH index: This corresponds to a PUCCH resource. The PUCCH index represents a PUCCH resource index, for example. The PUCCH resource index is mapped to at least one of an orthogonal cover (OC), a cyclic shift (CS) and a PRB.

ARI (ACK/NACK resource indicator): This is used to indicate a PUCCH resource. For example, the ARI can be used to indicate a resource change value (e.g. offset) with respect to a specific PUCCH resource (configured by a higher layer). Furthermore, the ARI can be used to indicate a specific PUCCH resource (group) index in a PUCCH resource (group) set (configured by a higher layer). The ARI can be included in a TPC field of a PDCCH corresponding to a PDSCH on an SCC. PUCCH power control is performed in a TPC field in a PDCCH (that is, PDCCH corresponding to a PDSCH on a PCC) that schedules the PCC. The ARI can be included in a TPC field of a PDCCH other than a PDCCH that has a downlink assignment index (DAI) initial value and schedules a specific cell (e.g. PCell). The ARI is used with a HARQ-ACK resource indication value.

DAI (downlink assignment index): this is included in DCI transmitted through a PDCCH. The DAI can indicate an order value or counter value of a PDCCH. A value indicated by a DAI field of a DL grant PDCCH is called a DL DAI and a value indicated by a DAI field of a UL grant PDCCH is called a UL DAI for convenience.

Implicit PUCCH resource: This represents a PUCCH resource/index linked to the smallest CCE index of a PDCCH that schedules a PCC (refer to Equation 1).

Explicit PUCCH resource: This can be indicated using the ARI.

PDCCH scheduling CC: This represents a PDCCH that schedules a PDSCH on a CC, that is, a PDCCH corresponding to a PDSCH on the CC.

PCC PDCCH: This represents a PDCCH that schedules a PCC. That is, the PCC PDCCH indicates a PDCCH corresponding to a PDSCH on the PCC. When it is assumed that cross-carrier scheduling is not allowed for the PCC, the PCC PDCCH is transmitted only on the PCC.

SCC PDCCH: This represents a PDCCH that schedules an SCC. That is, the SCC PDCCH indicates a PDCCH corresponding to a PDSCH on the SCC. When cross-carrier scheduling is allowed for the SCC, the SCC PDCCH can be transmitted on the PCC. On the other hand, when cross-carrier scheduling is not allowed for the SCC, the SCC PDCCH is transmitted only on the SCC.

Cross-CC scheduling: This represents an operation of scheduling/transmitting all PDCCHs through a single PCC.

Non-cross-CC scheduling: This represents an operation of scheduling/transmitting a PDCCH scheduling a CC through the CC.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
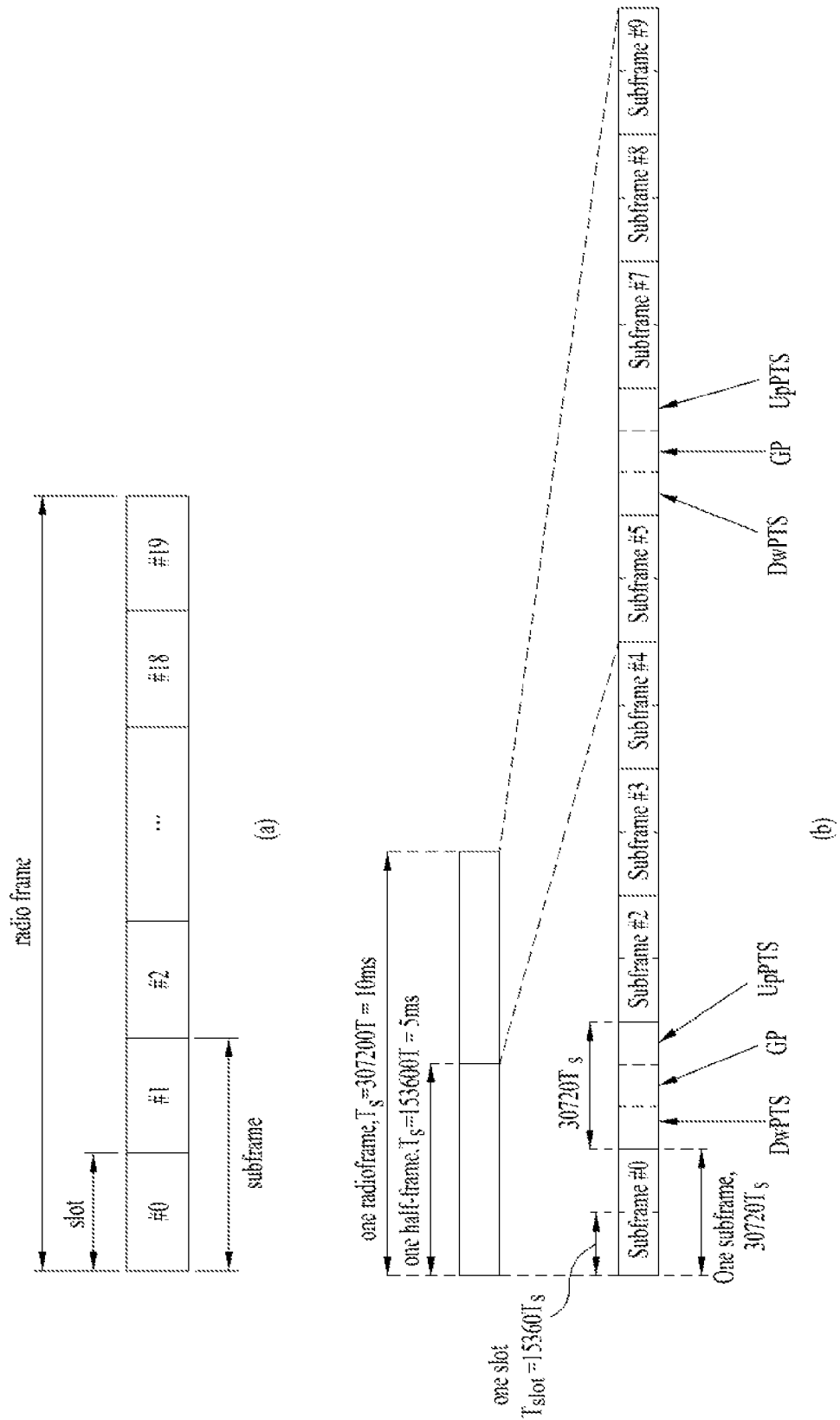
FIG. 2, including view (a) and view (b), illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multipath delay of a DL signal between a UL and a DL.

Table 1 shows UL-DL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

The radio frame structure is merely exemplary and the number of subframes included in the radio frame, the number of slots included in a subframe, and the number of symbols included in a slot can be vary.

Figure 3:
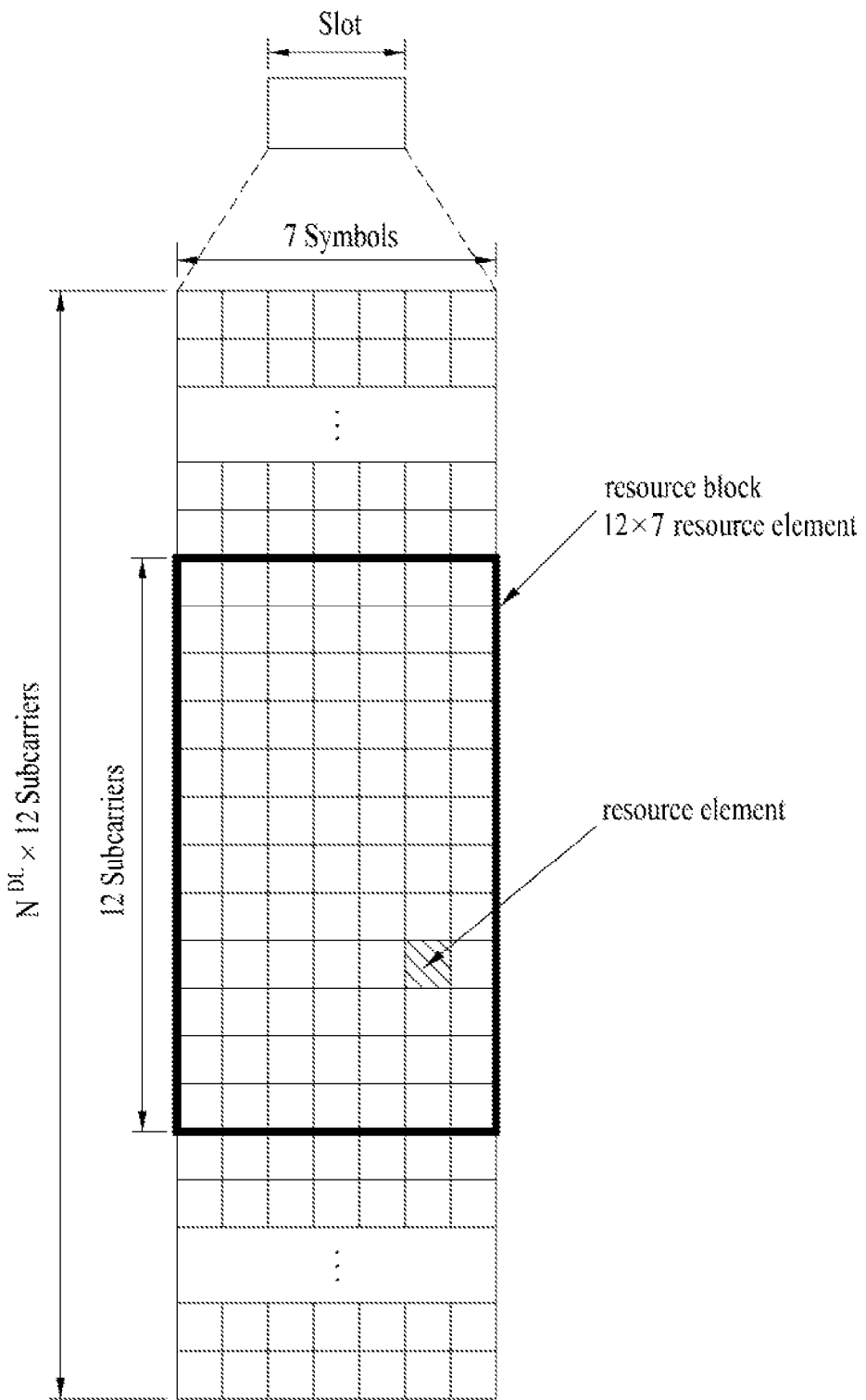
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 4:
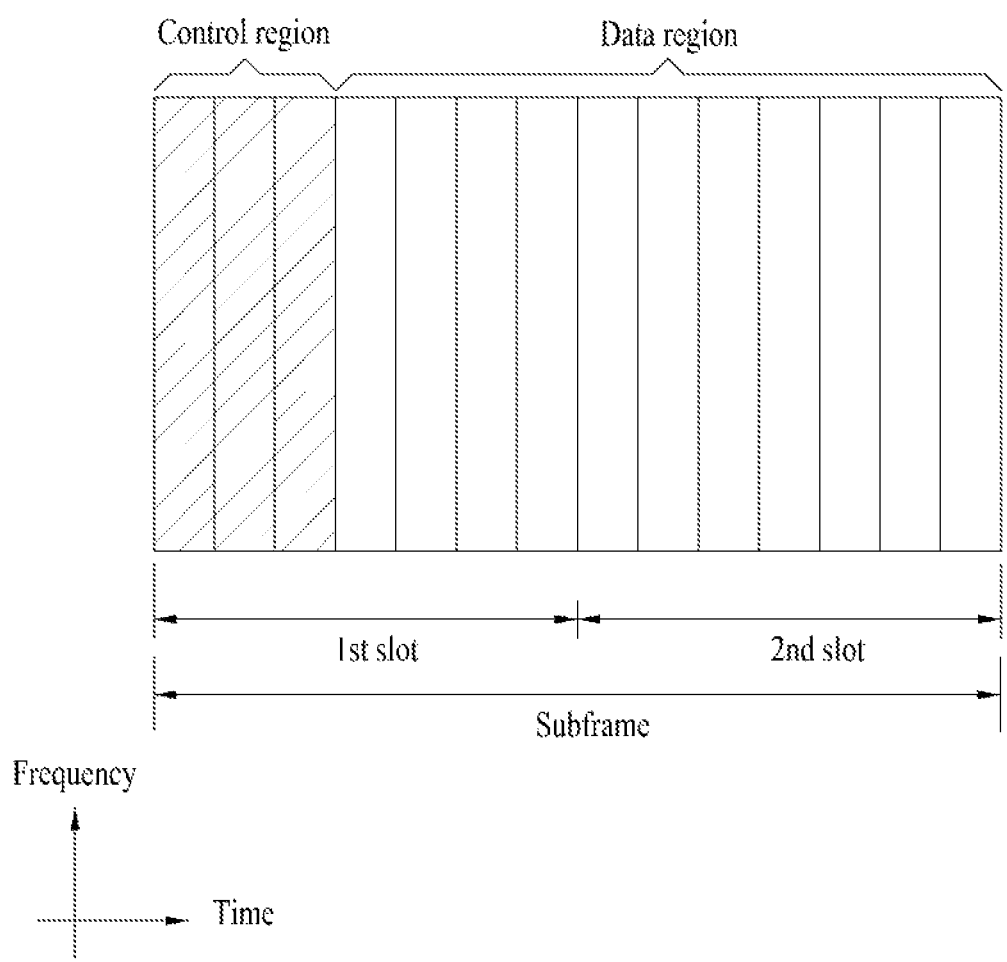
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
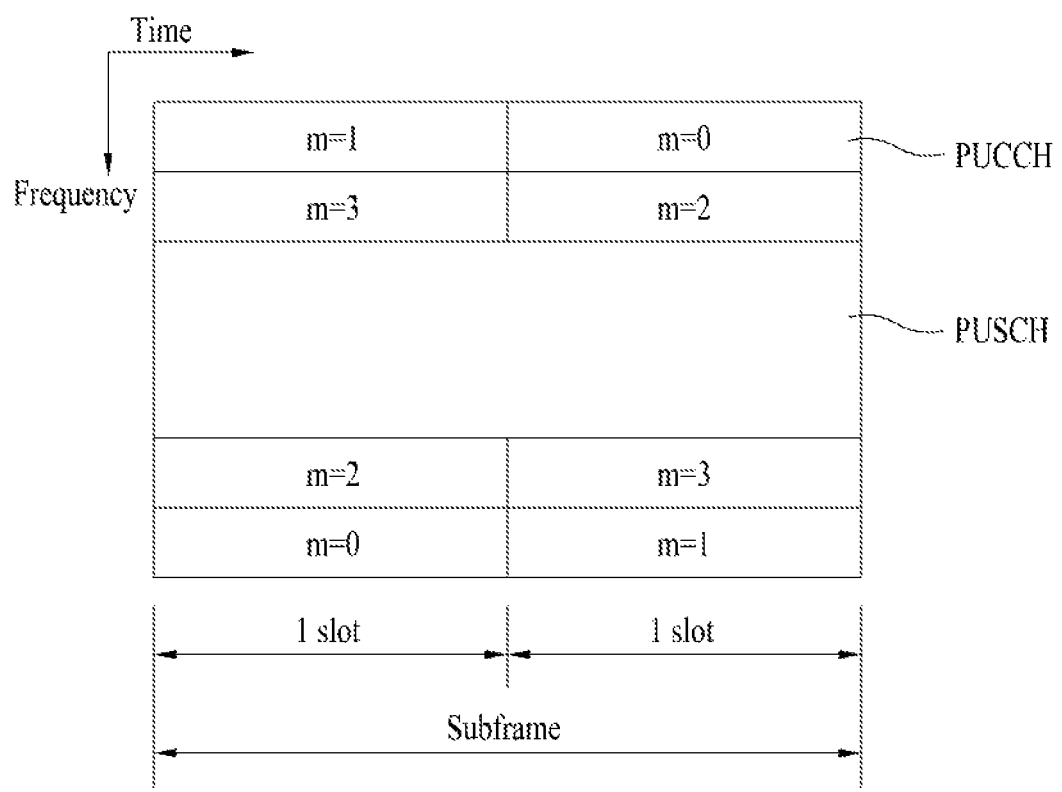
FIG. 5 illustrates an uplink subframe structure.

FIG. 5 illustrates an uplink subframe structure used in LTE.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.
- SR (scheduling request): This is information used to request a UL-SCH resource and is transmitted using On-Off Keying (OOK) scheme.
- HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.
- CQI (channel quality indicator): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 2 shows the mapping relationship between PUCCH formats and UCI in LTE.

TABLE 2

| PUCCH format | UCI (Uplink Control Information) |
| --- | --- |
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

Figure 6:
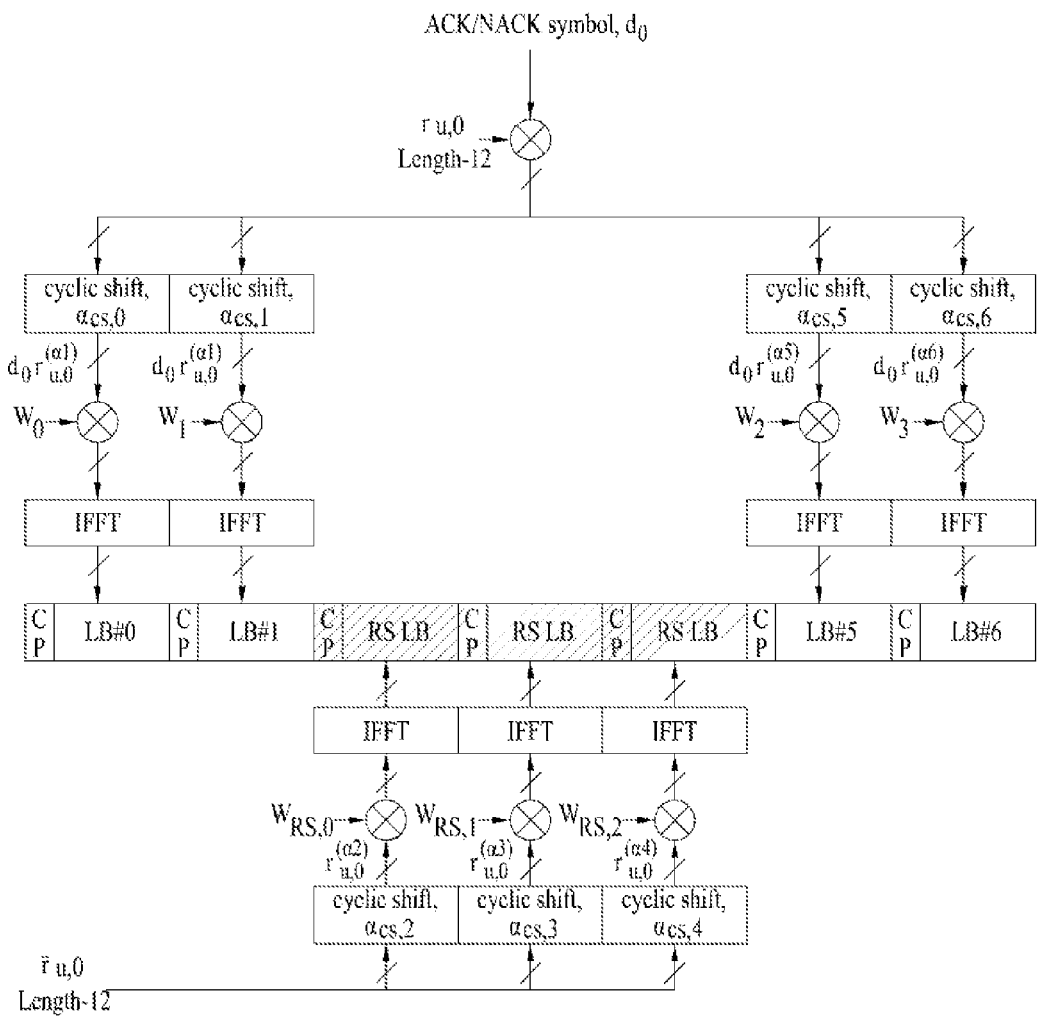
FIG. 6 illustrates a slot level structure of PUCCH format 1a/1b.

FIG. 6 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 6, 1-bit [b(0)] and 2-bit [b(0)b(1)] ACK/NACK information are modulated according to BPSK and QPSK modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 3 shows a modulation table defined for PUCCH formats 1a and 1b in LTE.

TABLE 3

| PUCCH format | b(0), . . . , b($M_{bit}$ − 1) | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code $W_0$, $W_1$, $W_2$, $W_3$, (e.g. Walsh-Hadamard or DFT code) in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

RSs transmitted from different UEs are multiplexed using the same method as is used to multiplex UCI. The number of cyclic shifts supported by SC-FDMA symbols for PUCCH ACK/NACK RB can be configured by cell-specific higher layer signaling parameter $\Delta_{shift}^{PUCCH}$. $\Delta_{shift}^{PUCCH} \in \{1, 2, 3\}$ represents that shift values are 12, 6 and 4, respectively. In time-domain CDM, the number of spreading codes actually used for ACK/NACK can be limited by the number of RS symbols because multiplexing capacity of RS symbols is less than that of UCI symbols due to a smaller number of RS symbols.

Figure 7:
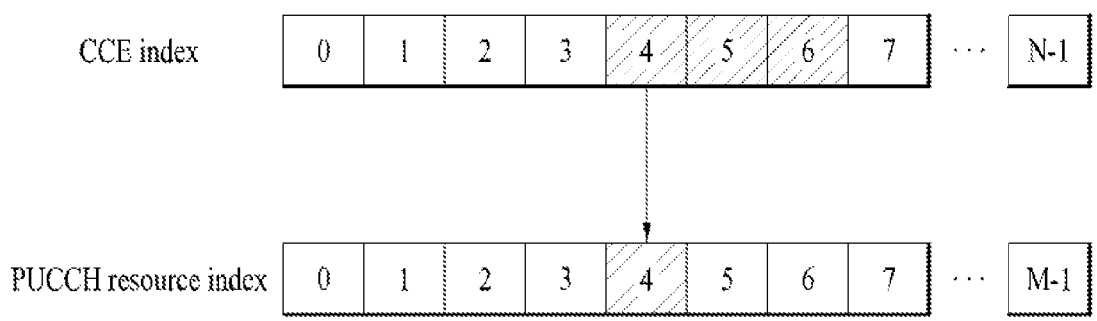
FIG. 7 illustrates an example of determining a PUCCH resource for ACK/NACK.

FIG. 7 illustrates an example of determining PUCCH resources for ACK/NACK. In LTE, a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered. The region in which the PDCCH is transmitted in a DL subframe is configured with a plurality of Control Channel Elements (CCEs), and the PDCCH transmitted to the UE is composed of one or more CCEs. The UE transmits the ACK/NACK signal through a PUCCH resource corresponding to a specific one (e.g. first CCE) of the CCEs constituting the received PDCCH.

Referring to FIG. 7, each block in a downlink component carrier (DL CC) represents a CCE and each block in an uplink component carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 7, a UE transmits an ACK/NACK signal on PUCCH #4 corresponding to CCE #4, the first CCE of the PDCCH. FIG. 7 illustrates a case in which maximum M PUCCHs are present in the UL CC when maximum N CCEs exist in the DL CC. Though N can equal M, N may differ from M and CCEs are mapped to PUCCHs in an overlapped manner.

Specifically, a PUCCH resource index in LTE is determined as follows.

$$n^{(1)}_{PUCCH} = n_{CCE} + N^{(1)}_{PUCCH} \qquad \text{[Equation 1]}$$

Here, $n^{(1)}_{PUCCH}$ represents a resource index of PUCCH format 1 for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a physical resource block (PRB) for PUCCH formats 1a/1b are obtained from $n^{(1)}_{PUCCH}$.

When an LTE system operates in TDD, a UE transmits a single multiplexed ACK/NACK signal for a plurality of PDSCHs received through different subframes. Methods of transmitting ACK/NACK for a plurality of PDSCHs include the following.

ACK/NACK bundling: ACK/NACK bits for a plurality of data units (e.g. PDSCH, SPS release PDCCH, etc.) are combined according to a logical AND operation. For example, upon successful decoding of all data units, an Rx node (e.g. UE) transmits ACK signals. If any of data units has not been decoded (detected), the Rx node does not transmit a NACK signal or no signal.

PUCCH selection: Upon reception of a plurality of PDSCHs, a UE occupies a plurality of PUCCH resources for ACK/NACK transmission. ACK/NACK responses to the plurality of PDSCHs are discriminated according to combinations of PUCCH resources used for ACK/NACK transmission and transmitted ACK/NACK information (e.g. bit values). This is also referred to as ACK/NACK selection.

PUCCH selection will now be described in detail. When the UE receives a plurality of DL data in the PUCCH selection scheme, the UE occupies a plurality of UL physical channels in order to transmit a multiplexed ACK/NACK signal. For example, when the UE receives a plurality of PDSCHs, the UE can occupy the same number of PUCCHs as the PDSCHs using a specific CCE of a PDCCH which indicates each PDSCH. In this case, the UE can transmit a multiplexed ACK/NACK signal using combination of which one of the occupied PUCCHs is selected and modulated/coded results applied to the selected PUCCH.

Table 4 shows a PUCCH selection scheme defined in the LTE system.

TABLE 3

| HARQ-ACK(0), HARQ-ACK(1), HARQ-ACK(2), HARQ-ACK(3) | Subframe $n^{(1)}_{PUCCH, X}$ | b(0), b(1) |
|---|---|---|
| ACK, ACK, ACK, ACK | $n^{(1)}_{PUCCH, 1}$ | 1, 1 |
| ACK, ACK, ACK, NACK/DTX | $n^{(1)}_{PUCCH, 1}$ | 1, 0 |
| NACK/DTX, NACK/DTX, NACK, DTX | $n^{(1)}_{PUCCH, 2}$ | 1, 1 |
| ACK, ACK, NACK/DTX, ACK | $n^{(1)}_{PUCCH, 1}$ | 1, 0 |
| NACK, DTX, DTX, DTX | $n^{(1)}_{PUCCH, 0}$ | 1, 0 |
| ACK, ACK, NACK/DTX, NACK/DTX | $n^{(1)}_{PUCCH, 1}$ | 1, 0 |
| ACK, NACK/DTX, ACK, ACK | $n^{(1)}_{PUCCH, 3}$ | 0, 1 |
| NACK/DTX, NACK/DTX, NACK/DTX, NACK | $n^{(1)}_{PUCCH, 3}$ | 1, 1 |
| ACK, NACK/DTX, ACK, NACK/DTX | $n^{(1)}_{PUCCH, 2}$ | 0, 1 |
| ACK, NACK/DTX, NACK/DTX, ACK | $n^{(1)}_{PUCCH, 0}$ | 0, 1 |
| ACK, NACK/DTX, NACK/DTX, NACK/DTX | $n^{(1)}_{PUCCH, 0}$ | 1, 1 |

TABLE 3-continued

| HARQ-ACK(0), HARQ-ACK(1), HARQ-ACK(2), HARQ-ACK(3) | Subframe $n^{(1)}_{PUCCH, X}$ | b(0), b(1) |
|---|---|---|
| NACK/DTX, ACK, ACK, ACK | $n^{(1)}_{PUCCH, 3}$ | 0, 1 |
| NACK/DTX, NACK, DTX, DTX | $n^{(1)}_{PUCCH, 1}$ | 0, 0 |
| NACK/DTX, ACK, ACK, NACK/DTX | $n^{(1)}_{PUCCH, 2}$ | 1, 0 |
| NACK/DTX, ACK, NACK/DTX, ACK | $n^{(1)}_{PUCCH, 3}$ | 1, 0 |
| NACK/DTX, ACK, NACK/DTX, NACK/DTX | $n^{(1)}_{PUCCH, 1}$ | 0, 1 |
| NACK/DTX, NACK/DTX, ACK, ACK | $n^{(1)}_{PUCCH, 3}$ | 0, 1 |
| NACK/DTX, NACK/DTX, ACK, NACK/DTX | $n^{(1)}_{PUCCH, 2}$ | 0, 0 |
| NACK/DTX, NACK/DTX, NACK/DTX, ACK | $n^{(1)}_{PUCCH, 3}$ | 0, 0 |
| DTX, DTX, DTX, DTX | N/A | N/A |

In Table 4, HARQ-ACK(i) indicates the HARQ ACK/NACK/DTX result of an i-th data unit ($0 \leq i \leq 3$). Results of HARQ ACK/NACK/DTX include ACK, NACK, DTX and NACK/DTX. NACK/DTX represents NACK or DTX. ACK represents that a transport block (equivalent to a code block) transmitted on a PDSCH has been successfully decoded whereas NACK represents that the transport block has not been successfully decode. DTX (discontinuous transmission) represents that PDCCH detection failure. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 4, $n^{(1)}_{PUCCH,X}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except some cases (NACK/DTX, N/D).

PUSCH piggybacking will now be described. Since an LTE UE cannot simultaneously transmit a PUCCH and a PUSCH, the LTE UE multiplexes UCI (e.g. CQI/PMI, HARQ-ACK, RI, etc.) in a PUSCH region when the UCI needs to be transmitted through a subframe in which a PUSCH is transmitted.

Figure 8:
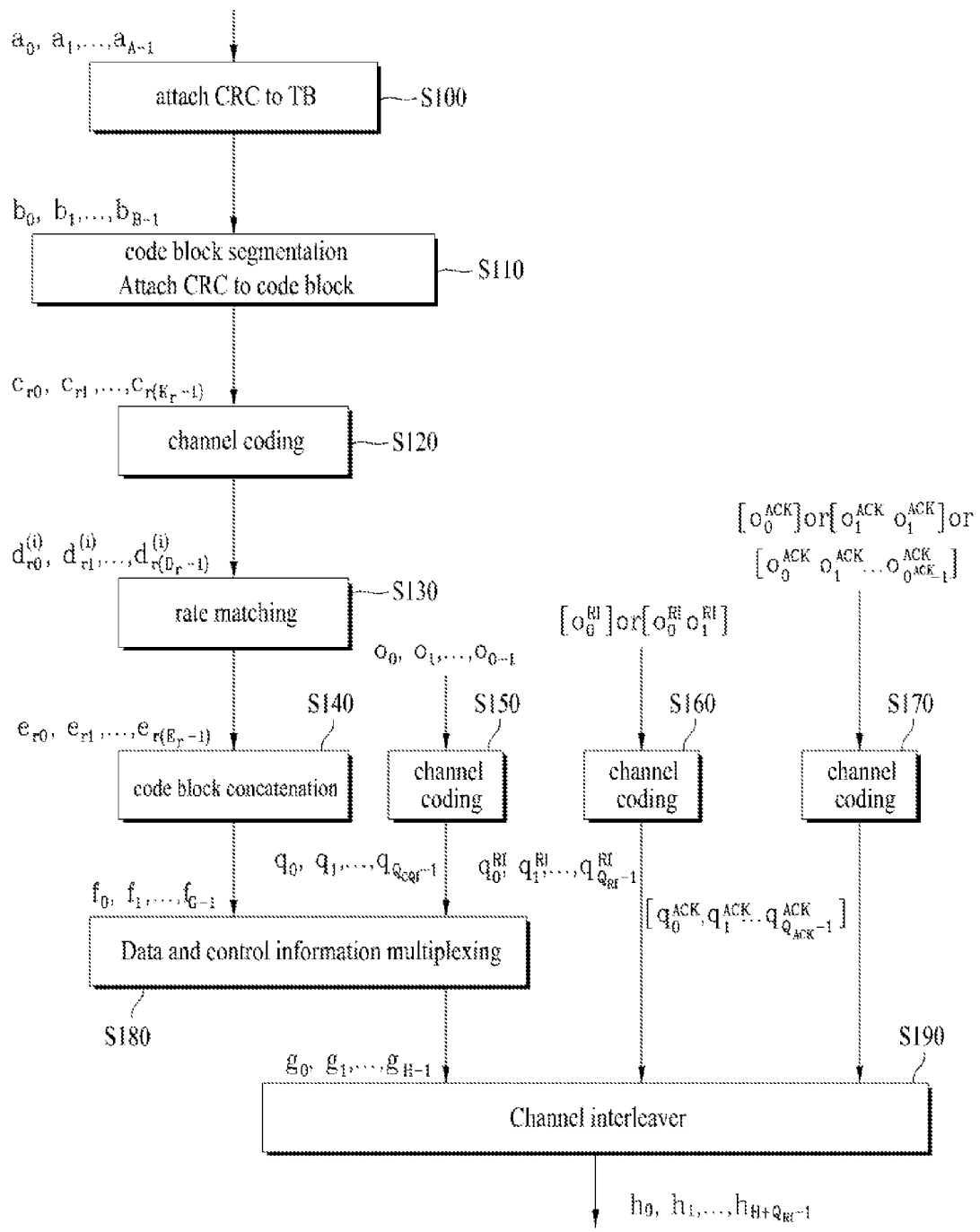
FIG. 8 illustrates a procedure of processing UL-SCH data and control information.

FIG. 8 illustrates a procedure of processing UL-SCH data and control information. Refer to 36.212 V8.7.0 (2009.05) 5.2.2 to 5.2.2.8 for more detailed procedure.

Referring to FIG. 8, error detection is performed in such a manner that a CRC (cyclic redundancy check) is attached to a UL-SCH transport block (TB) (S100).

The whole TB is used to calculate CRC parity bits. The TB has bits of $a_0, a_1, a_2, a_3, \ldots, a_{A-1}$. The parity bits are $p_0, p_1, p_2, p_3, \ldots, p_{L-1}$. The TB has a size of A and the number of parity bits is L.

After attachment of the CRC to the TB, code block segmentation and CRC attachment to a code block are performed (S110). Bits $b_0, b_1, b_2, b_3, \ldots, b_{B-1}$ are input for code block segmentation. Here, B denotes the number of bits of the TB (including the CRC). Bits $c_{r0}, c_{r1}, c_{r2}, c_{r3}, \ldots, c_{r(Kr-1)}$ are obtained from code block segmentation. Here, r denotes a code block number (r=0, 1, ..., C−1), Kr denotes the number of bits of a code block r, and C denotes the total number of code blocks.

Channel coding follows code block segmentation and CRC attachment to a code block (S120). Bits $d^{(i)}_{r0}, d^{(i)}_{r1}, d^{(i)}_{r2}, d^{(i)}_{r3}, \ldots, d^{(i)}_{r(Kr-1)}$ are obtained from channel coding. Here, i=0, 1, 2 and Dr denotes the number of bits of an i-th coded stream for the code block r (i.e. DR=Kr+4). In addition, r denotes the code block number (r=0, 1, . . . , C−1), Kr denotes the number of bits of the code block r, and C represents the total number of code blocks. Turbo coding may be used as channel coding.

Channel coding is followed by rate matching (S130). Bits $e_{r0}, e_{r1}, e_{r2}, e_{r3}, \ldots, e_{r(Er-1)}$ are obtained from rate matching. Here, Er denotes the number of rate-matched bits of an r-th code block (r=0, 1, . . . , C−1) and C denotes the total number of code blocks.

Rate matching is followed by code block connection (S140). Bits $f_0, f_1, f_2, f_3, \ldots, f_{G-1}$ are obtained from code block connection. Here, G denotes the number of coded bits for transmission. When, control information transmission and UL-SCH transmission are multiplexed, bits used for control information transmission are not included in G. The bits $f_0, f_1, f_2, f_3, \ldots, f_{G-1}$ correspond to a UL-SCH codeword.

In case of UCI, channel quality information (CQI and/or PMI) ($o_0, o_1, \ldots, o_{O-1}$), RI ($[o_0^{RI}]$ or $[o_0^{RI} o_1^{RI}]$) and HARQ-ACK ($[o_0^{ACK}]$, $[o_0^{ACK} o_1^{ACK}]$ or $[o_0^{ACK} o_1^{ACK} o_{o^{ACK}-1}^{ACK}]$) are independently channel-coded (S150 to S170). Channel coding of UCI is performed on the basis of the number of coded symbols for control information. For example, the number of coded symbols can be used for rate matching of coded control information. The number of coded symbols corresponds to the number of modulation symbols and the number of REs in the following process.

Channel coding of HARQ-ACK is performed using an input bit sequence $[o_0^{ACK}]$, $[o_0^{ACK} o_1^{ACK}]$ or $[o_0^{ACK} o_1^{ACK} o_{o^{ACK}-1}^{ACK}]$ of step S170. $[o_0^{ACK}]$ and $[o_0^{ACK} o_1^{ACK}]$ respectively correspond to 1-bit HARQ-ACK and 2-bit HARQ-ACK, and $[o_0^{ACK} o_1^{ACK} o_{o^{ACK}-1}^{ACK}]$ refers to HARQ-ACK composed of 3 bits or more (i.e. $O^{ACK}>2$). ACK is coded into 1 and NACK is coded into 0. Repetition coding is used for 1-bit HARQ-ACK. A (3, 2) simplex code is used for 2-bit HARQ-ACK and encoded data can be cyclically repeated. In the case of HARQ-ACK having 3 bits or more, a (32, 0) block code is used. More specifically, referring to 36.212 V8.7.0 (2009.05) 5.2.2.6 "Channel coding of control information", in the case of HARQ-ACK having 3 bits or more, a channel-coded bit sequence $q_0^{ACK}, q_1^{ACK}, q_2^{ACK}, \ldots, q_{Q_{ACK}-1}^{ACK}$ is obtained using the following equation. $Q_{ACK}$ denotes the total number of coded bits.

$$q_i^{ACK} = \sum_{n=0}^{O^{ACK}-1} (o_n^{ACK} \cdot M_{(i\,mod\,32),n}) \bmod 2 \quad \text{[Equation 2]}$$

Here, $q_i^{ACK}$ denotes an i-th channel-coded bit, i denotes an integer in the range of 0 to $Q_{ACK-1}$, mod represents a modulo operation and M represents a block code described below. $Q_{ACK}=Q'_{ACK} \times Q_m$ and $Q'_{ACK}$ denotes the number of coded symbols for HARQ-ACK and $Q_m$ is a modulation order. $Q_m$ is set to the same as that of UL-SCH data.

Table 5 shows a RM (Reed-Muller) code defined in LTE.

TABLE 5

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 1 | 0 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The coded UL-SCH bits $f_0, f_1, f_2, f_3, \ldots, f_{G-1}$ and coded CQI/PMI bits $q_0, q_1, q_2, q_3, \ldots, q_{CQI-1}$ are input to a data/control multiplexing block (S180). The data/control multiplexing block outputs bits $g_0, g_1, g_2, \ldots, g_{H'-1}$. $g_i$ is a column vector of length Qm (i=0, . . . , H'−1). H'=H/Qm and H=(G+$Q_{CQI}$). H denotes the total number of coded bits allocated for UL-SCH data and CQI/PMI.

The output of the data/control multiplexing block, $g_0, g_1, g_2, \ldots, g_{H'-1}$, a coded rank indicator $q_0^{RI}, q_1^{RI}, q_2^{RI}, \ldots, q_{Q'_{RI}-1}^{RI}$ and coded HARQ-ACK $q_0^{ACK}, q_1^{ACK}, q_2^{ACK}, \ldots, q_{Q'_{ACK}-1}^{ACK}$ are input to a channel interleaver (S190). $g_i$ is a column vector of length Qm for CQI/PMI, and i=0, H'−1

(H'=H/Qm). $\underline{q}^{ACK}{}_i$ is a column vector length Qm for ACK/NACK, and i=0, . . . , $Q'_{ACK-1}$ ($Q'_{ACK}=Q_{ACK}/Qm$). $\underline{q}^{RI}{}_i$ is a column vector of length Qm for RI and i=0, . . . , $Q'_{RI-1}$ ($Q'_{RI}=Q_{RI}/Qm$).

The channel interleaver multiplexes control information and UL-SCH data for PUSCH transmission. Specifically, the channel interleaver maps the control information and UL-SCH data to a channel interleaver matrix corresponding to a PUSCH resource.

The channel interleaver outputs a bit sequence $h_0$, $h_1$, $h_2$, . . . , $h_{GH+QRI-1}$ read from the channel interleaver matrix column by column. The read bit sequence is mapped to a resource grid. $H'=H'+Q'_{RI}$ modulation symbols are transmitted through a subframe.

Figure 9:
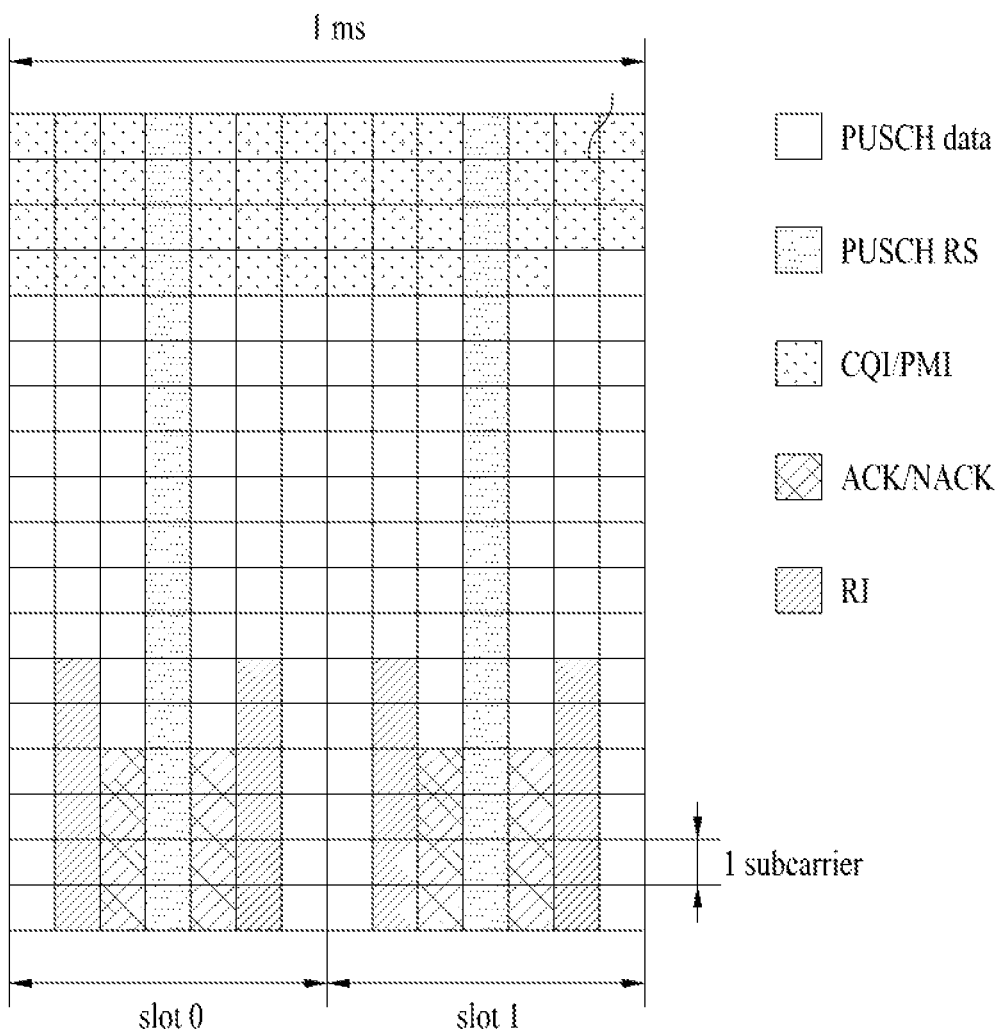
FIG. 9 illustrates multiplexing of control information and UL-SCH data on a PUSCH.

FIG. 9 illustrates multiplexing of control information and UL-SCH data on a PUSCH. When a UE attempts to transmit control information through a subframe to which PUSCH transmission is allocated, the UE multiplexes the control information (UCI) and UL-SCH data prior to DFT-spreading. The control information includes at least one of CQI/PMI, HARQ ACK/NACK and RI. The number of REs used for transmission of each of CQI/PMI, HARQ ACK/NACK and RI is based on a MCS (modulation and coding scheme) and an offset values $\Delta_{offset}^{CQI}$, $\Delta_{offset}^{HARQ-ACK}$ and $\Delta_{offset}^{RI}$ allocated for PUSCH transmission. The offset value performs different coding rates according to control information and is semi-statically set by a higher layer (e.g. RRC) signal. The UL-SCH data and control information are not mapped to the same RE. The control information is mapped such that the same occupies both slots of a subframe.

Referring to FIG. 9, CQI and/or PMI (CQI/PMI) resources are located at the start of a UL-SCH data resource, sequentially mapped to all SC-FDMA symbols on one subcarrier, and then mapped to the next subcarrier. CQI/PMI is mapped from left to right in a subframe, that is, in a direction in which an SC-FDMA symbol index increases. PUSCH data (UL-SCH data) is rate-matched in consideration of the quantity of CQI/PMI resources (i.e. the number of coded symbols). The same modulation order as the UL-SCH data is used for CQI/PMI. ACK/NACK is embedded into part of an SC-FDMA resource to which the UL-SCH data is mapped through puncturing. ACK/NACK is located beside an RS and mapped to SC-FDMA symbols from bottom to top, that is, in a direction in which a subcarrier index increases. In the case of normal CP, SC-FDMA symbols for ACK/NACK correspond to SC-FDMA symbols #2/#5 in each slot, as shown in FIG. 7. A coded RI is located beside a symbol for ACK/NACK irrespective of whether ACK/NACK is actually transmitted through the corresponding subframe.

In LTE(-A), control information (using QPSK, for example) can be scheduled such that it is transmitted on a PUSCH without UL-SCH data. The control information (CQI/PMI, RI and/or ACK/NACK) is multiplexed before DFT-spreading in order to maintain low CM (cubic metric) single-carrier characteristics. ACK/NACK, RI and CQI/PMI are multiplexed in a manner similar to the process shown in FIG. 7. SC-FDMA symbols for ACK/NACK are located by an RS, and a resource to which CQI is mapped can be punctured. The number of REs for ACK/NACK and RI is based on a reference MCS (CQI/PMI MCS) and an offset parameter $\Delta_{offset}^{CQI}$, $\Delta_{offset}^{HARQ-ACK}$ or $\Delta_{offset}^{RI}$. The reference MCS is calculated from a CQI payload size and resource allocation. Channel coding and rate matching for control signaling without UL-SCH data correspond to the above-described control signaling with UL-SCH data.

Figure 10:
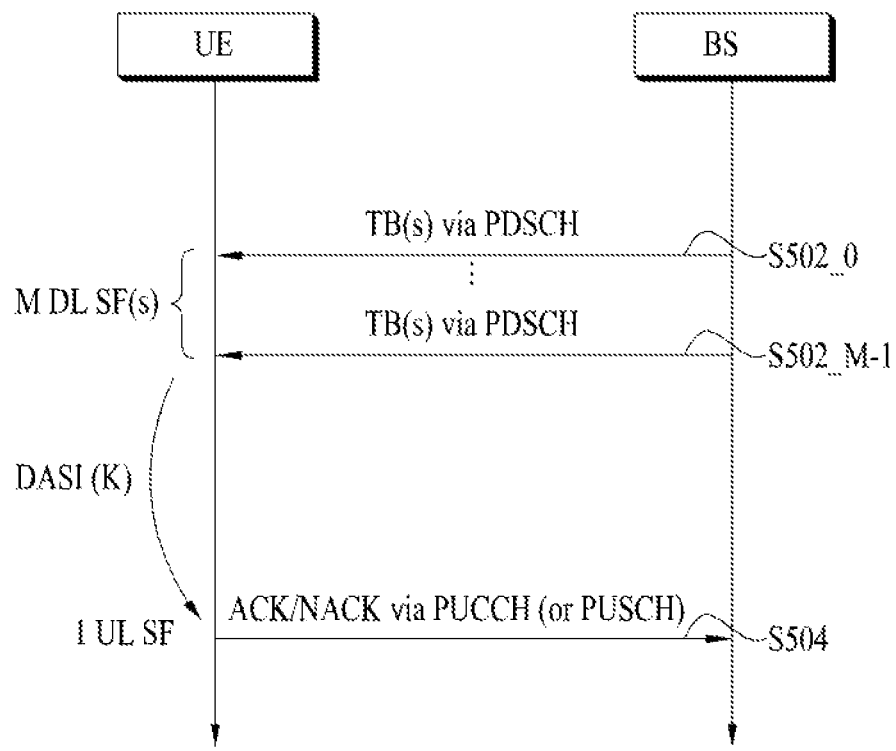
FIG. 10 illustrates a TDD UL ACK/NACK (uplink acknowledgement/negative acknowledgement) transmission procedure in a single cell situation.

FIG. 10 illustrates a TDD UL ACK/NACK transmission process in a single cell situation.

Referring to FIG. 10, a UE can receive one or more PDSCH signals in M DL subframes (SFs) (S502_0 to S502_M−1). Each PDSCH signal is used to transmit one or more (e.g. 2) transport blocks (TBs) (or codewords) according to transmission mode. A PDCCH signal requiring an ACK/NACK response, for example, a PDCCH signal indicating SPS (semi-persistent scheduling) release (simply, SPS release PDCCH signal) may also be received in step S502_0 to S502_M−1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically (refer to FIGS. 6 and 7), ACK/NACK can be transmitted through a PUSCH when a PUSCH is transmitted at ACK/NACK transmission time (refer to FIGS. 8 and 9). Various PUCCH formats shown in Table 2 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s):1 UL SF) and the relationship therebetween is determined by a DASI (downlink association set index).

Table 6 shows DASI (K: {k0, k1, . . . , $k_{M-1}$}) defined in LTE(-A). Table 6 shows spacing between a UL subframe transmitting ACK/NACK and a DL subframe relating to the UL subframe. Specifically, when a PDCCH indicating PDSCH transmission and/or (downlink) SPS release is present in a subframe n-k (k∈K), the UE transmits ACK/NACK in a subframe n.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 11:
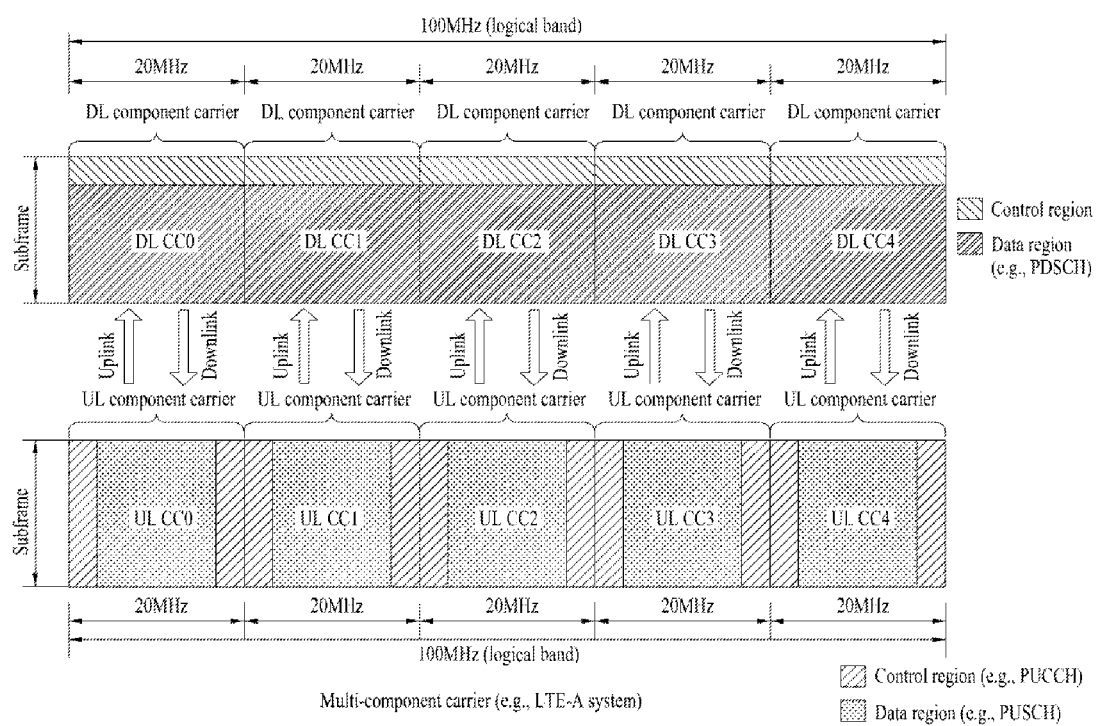
FIG. 11 illustrates a CA (carrier aggregation) communication system.

FIG. 11 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 11, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources [refer to 36.300 V10.2.0 (2010-12) 5.5 Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 12:
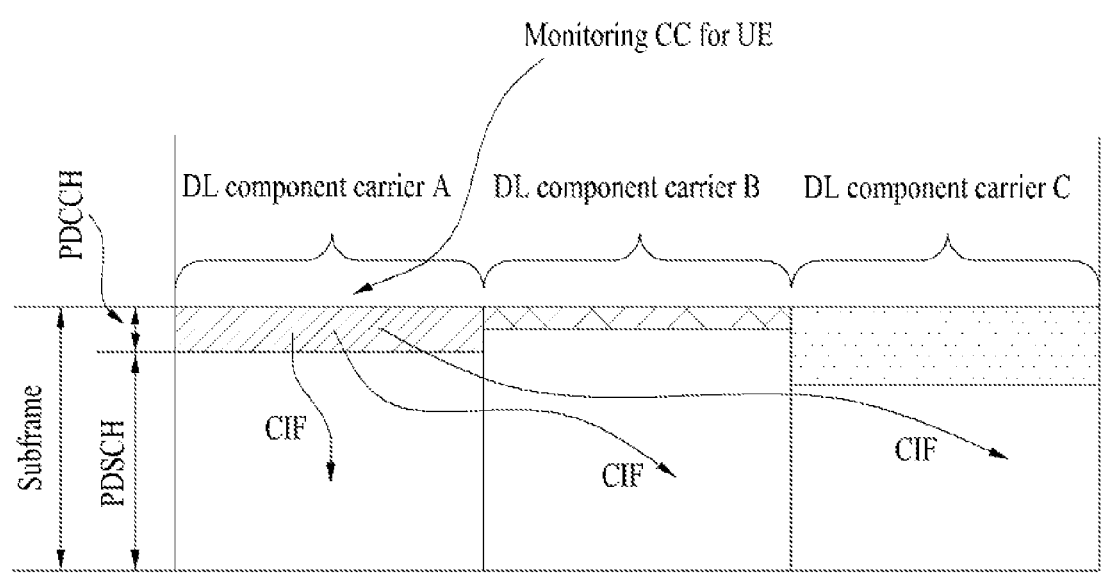
FIG. 12 illustrates cross-carrier scheduling.

FIG. 12 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

Embodiment: ACK/NACK Transmission in CA Based TDD System

In an ACK/NACK multiplexing (i.e. ACK/NACK selection) method of an LTE TDD system, implicit ACK/NACK selection using an implicit PUCCH resource (e.g. linked to a lowest CCE index used for PDCCH transmission) corresponding to a PDCCH that schedules a PDSCH of each UE is used in order to secure PUCCH resources of each UE. An LTE-A FDD system considers transmission of a plurality of ACK/NACK signals for a plurality of PDSCHs transmitted through a plurality of DL CCs using a UE-specifically configured UL CC (e.g. PCC or PCell). To achieve this, ACK/NACK selection using implicit PUCCH resource(s) (e.g. linked to a lowest CCE index $n_{CCE}$ or to $n_{CCE}$ and $n_{CCE}+1$) linked to PDCCH(s) that schedule a specific DL CC or some or all DL CCs or a combination of the implicit PUCCH resource and an explicit PUCCH resource reserved for each UE through RRC signaling is considered.

An LTE-A TDD system can also consider aggregation of a plurality of CCs. Accordingly, transmission of a plurality of ACK/NACK signals for a plurality of PDSCHs, transmitted through a plurality of DL subframes and a plurality of DL CCs, through a specific UL CC (e.g. PCC or PCell) in UL subframes corresponding to the DL subframes is considered. Here, it is possible to use a method of transmitting a plurality of ACK/NACK signals corresponding to a maximum number of CWs, which can be transmitted through all DL CCs allocated to a UE, for all DL subframes (referred to as full ACK/NACK hereinafter) unlike LTE-A FDD. Furthermore, a method of reducing the number of ACK/NACKs by applying ACK/NACK bundling in CWs and/or CCs and/or SF domains and transmitting a reduced number of ACK/NACKs (referred to as bundled ACK/NACK hereinafter) can be considered. CW bundling refers to application of ACK/NACK bundling to each DL SF per CC. CW bundling is also referred to as spatial bundling. CC bundling refers to application of ACK/NACK bundling to all or some CCs per DL SF. SF bundling refers to application of ACK/NACK bundling to all or some DL SFs per CC. ACK/NACK bundling includes application of a logical AND operation to a plurality of ACK/NACK responses.

In a CA based TDD system, a situation in which a DAI-counter (DAI-c) is operated per DL CC using a DAI field in a DL grant PDCCH can be considered. The DAI-c can start from 0, 1 or an arbitrary number and it is assumed that the DAI-c starts from 1 for convenience). DAI-c is used interchangeably with DL DAI.

DAI-c (or DL DAI): this can indicate the order of PDSCHs or DL grant PDCCHs scheduled on the basis of DL SF order. That is, a DAI-counter value can indicate an accumulated value (i.e. counted value) of PDCCH(s) corresponding to PDSCH(s) and PDCCH(s) indicating SPS release in DL subframes n–k (k∈K) up to the current subframe. The order indicated by the DAI-c can be an order excluding a PDSCH w/o PDCCH. For example, when PDSCHs are scheduled through DL SFs #1 and #3, DAI-c values in PDCCHs scheduling the same can be respectively signaled as 1 and 2. Even considering a TDD configuration (e.g. UL-DL configuration #5 of Table 1) of DL SF:UL SF=9:1 based on 2-bit DAI-c, the following modulo-4 operation is applicable.

DAI-c of the first, fifth or ninth scheduled PDSCH or DL grant PDCCH is 1.

DAI-c of the second or sixth scheduled PDSCH or DL grant PDCCH is 2.

DAI-c of the third or seventh scheduled PDSCH or DL grant PDCCH is 3.

DAI-counter of the fourth or eighth scheduled PDSCH or DL grant PDCCH is 4.

Here, a PDSCH/DL grant PDCCH/PDSCH or DL grant PDCCH refers to PDSCH/DL grant PDCCH/PDSCH or DL grant PDCCH that requires an ACK/NACK response. The PDSCH includes a PDSCH with a PDCCH corresponding thereto (referred to as a PDSCH w/PDCCH hereinafter) and a PDSCH without a PDCCH corresponding thereto (referred to as a PDSCH w/o PDCCH hereinafter) (e.g. SPS PDSCH). The DL grant PDCCH includes a PDCCH (referred to as an SPS release PDCCH) indicating SPS release. The DL grant PDCCH can be generalized as a DL scheduling related PDCCH.

In the CA based TDD system, it is possible to consider an ACK-counter that indicates a total number of ACKs (or the number of some ACKs) for all PDSCHs and/or DL grant PDCCHs received through a single DL CC in order to apply SF bundling, based on CW bundling, to a plurality of ACK/NACKs for a plurality of DL CC/SF using DAI-c. The following schemes can be considered as the ACK-counter.

Bundled ACK-counter

This scheme indicates the number of ACKs (i.e. an ACK-counter value) only when the number of received DAI-c values corresponds to the total number of ACKs and processes the ACK-counter value as 0 in other cases. When a PDSCH w/o PDCCH (e.g. SPS PDCCH) is present, the number of ACKs (i.e. ACK-counter value) is indicated only when the total number of ACKs including an ACK for the PDSCH w/o PDCCH equals to (the number of received DAI-c values+1) and the ACK-counter value is processed as 0 in other cases.

Consecutive ACK-counter

This scheme indicates the number of ACKs (i.e. an ACK-counter value) corresponding to a DAI-c value that starts from a DAI-c initial value (e.g. 1) (PDSCH or DL grant PDCCH corresponding thereto) and continuously increases and processes the ACK-counter value as 0 when ACK is not assigned to the DAI-c initial value. When a PDSCH w/o PDCCH (e.g. SPS PDCCH) is present, the number of ACKs (i.e. an ACK-counter value) corresponding to a DAI-c value that starts from ACK for the PDSCH w/o PDCCH (DAI-c initial value) and continuously increases can be indicated and the ACK-counter value can be processed as 0 when NACK is assigned to the PDSCH w/o PDCCH.

Even considering a TDD configuration of DL SF:UL SF=9:1 based on a 2-bit ACK-counter, the following modulo-3 operation is applicable.

ACK-counter=0 when the number of ACKs is 0 (or NACK or DTX)

ACK-counter=1 when the number of ACKs is 1, 4 or 7.

ACK-counter=2 when the number of ACKs is 2, 5 or 8.

ACK-counter=3 when the number of ACKs is 3, 6 or 9.

In CA based TDD, a method of transmitting an ACK-counter value for each DL CC through multi-bit ACK/NACK coding or ACK/NACK selection can be considered as a method of transmitting a plurality of ACK/NACKs for a plurality of DL CCs. ACK-counter based PUCCH ACK/NACK transmission is referred to as a perCC-Acount method and consecutive ACK-based ACK/NACK selection is referred to as an Acount-Chsel method for convenience.

Tables 7, 8 and 9 show HARQ-ACK response-to-AN state mapping per CC for application of Acount-Chsel in a TDD configuration in which DL SF:UL SF=M:1. Tables 7, 8 and 9 respectively correspond to M=2, M=3 and M=4. In the tables, A denotes ACK, N denotes NACK and D denotes no reception of data or a PDCCH (i.e. DTX). N/D represents NACK or DTX, and any represents one of ACK, NACK and DTX.

TABLE 7

| HARQ-ACK(0), HARQ-ACK(1) | A/N state |
|---|---|
| A, A | A, A |
| N/D, A | N/D, A |
| A, N/D | A, N/D |
| N/D, N/D | N/D, N/D |

Here, HARQ-ACK(0), (1)=(N, N/D) can be mapped to an A/N state (N, N) and HARQ-ACK(0), (1)=(D, N/D) can be mapped to an A/N state (D, D). In addition, HARQ-ACK(0), (1)=(N, N/D) can be mapped to an A/N state (N, N/D) and HARQ-ACK(0), (1)=(D, N/D) can be mapped to an A/N state (D, N/D).

HARQ-ACK(j) (0≤j≤M−1) (M=2) refers to an ACK/NACK/DTX response to a PDSCH or a DL grant PDCCH (e.g. SPS release PDCCH) transmitted through a (j+1)-th DL SF.

TABLE 8

| HARQ-ACK(0), HARQ-ACK(1), HARQ-ACK(2) | A/N state |
|---|---|
| A, A, A | A, A |
| A, A, N/D | N/D, A |

TABLE 8-continued

| HARQ-ACK(0), HARQ-ACK(1), HARQ-ACK(2) | A/N state |
|---|---|
| A, N/D, any | A, N/D |
| N/D, any, any | N/D, N/D |

Here, HARQ-ACK(0), (1), (2)=(N, any, any) can be mapped to an A/N state (N, N) and HARQ-ACK(0), (1), (2)=(D, any, any) can be mapped to an A/N state (D, D). In addition, HARQ-ACK(0), (1), (2)=(N, any, any) can be mapped to an A/N state (N, N/D) and HARQ-ACK(0), (1), (2)=(D, any, any) can be mapped to an A/N state (D, N/D).

HARQ-ACK(j) ($0 \leq j \leq M-1$) (M=3) refers to an ACK/NACK/DTX response to a PDSCH or a DL grant PDCCH (e.g. SPS release PDCCH) corresponding to DAI-c=j+1. Equivalently, HARQ-ACK(j) ($0 \leq j \leq M-1$) (M=3) can refer to an ACK/NACK/DTX response to a PDSCH corresponding to a PDCCH having DAI-c=j+1 or an ACK/NACK/DTX response to an SPS release PDCCH corresponding to DAI-c=j+1. When a PDSCH w/o PDCCH (e.g. SPS PDSCH) is present, HARQ-ACK(0) can refer to an ACK/NACK/DTX response to the PDSCH w/o PDCCH and HARQ-ACK(j) ($1 \leq j \leq M-1$) can refer to a PDSCH or a DL grant PDCCH (e.g. SPS release PDCCH) corresponding to DAI-c=j. The PDSCH w/o PDCCH can be transmitted on a PCC.

TABLE 9

| HARQ-ACK(0), HARQ-ACK(1), HARQ-ACK(2), HARQ-ACK(3) | A/N state |
|---|---|
| A, A, A, N/D | A, A |
| A, A, N/D, any | N/D, A |
| (A, D, D, D) or (A, A, A, A) | A, N/D |
| (N/D, any, any, any) or (A, N/D, any, any), except for (A, D, D, D) | N/D, N/D |

Here, HARQ-ACK(0), (1), (2), (3)=(N, any, any, any) or (A, N/D, any, any) except for (A, D, D, D) can be mapped to an A/N state (N, N) and HARQ-ACK(0), (1), (2), (3)=(D, any, any, any) can be mapped to an A/N state (D, D). In addition, HARQ-ACK(0), (1), (2), (3)=(N, any, any, any) or (A, N/D, any, any) except for (A, D, D, D) can be mapped to an A/N state (N, N/D) and HARQ-ACK(0), (1), (2), (3)=(D, any, any, any) can be mapped to an A/N state (D, N/D).

HARQ-ACK(j) ($0 \leq j \leq M-1$) (M=4) refers to an ACK/NACK/DTX response to a PDSCH or a DL grant PDCCH (e.g. SPS release PDCCH) corresponding to DAI-c=j+1. Equivalently, HARQ-ACK(j) ($0 \leq j \leq M-1$) (M=4) can refer to an ACK/NACK/DTX response to a PDSCH corresponding to a PDCCH having DAI-c=j+1 or an ACK/NACK/DTX response to an SPS release PDCCH corresponding to DAI-c=j+1. When a PDSCH w/o PDCCH (e.g. SPS PDSCH) is present, HARQ-ACK(0) can refer to an ACK/NACK/DTX response to the PDSCH w/o PDCCH and HARQ-ACK(j) ($1 \leq j \leq M-1$) can refer to a PDSCH or a DL grant PDCCH (e.g. SPS release PDCCH) corresponding to DAI-c=j. The PDSCH w/o PDCCH can be transmitted on a PCC.

After generation of a 2-bit A/N state per CC based on Tables 7, 8 and 9, A/N information can be finally transmitted through an A/N state-to-resource/constellation mapping process. Table 10 shows A/N state-to-resource/constellation mapping when two CCs (or cells) are configured. The two CCs (or cells) include a PCC (or PCell) and an SCC (or SCell).

TABLE 10

| B0 | B1 | B2 | B3 | Resource | Constellation |
|---|---|---|---|---|---|
| D | N/D | N/D | N/D | NO TRANSMISSION | NO TRANSMISSION |
| N | N/D | N/D | N/D | H0 | +1 |
| A | N/D | N/D | N/D | H0 | −1 |
| N/D | A | N/D | N/D | H1 | −j |
| A | A | N/D | N/D | H1 | +j |
| N/D | N/D | A | N/D | H2 | +1 |
| A | N/D | A | N/D | H2 | +j |
| N/D | A | A | N/D | H2 | −j |
| A | A | A | N/D | H2 | −1 |
| N/D | N/D | N/D | A | H3 | +1 |
| A | N/D | N/D | A | H0 | −j |
| N/D | A | N/D | A | H3 | +j |
| A | A | N/D | A | H0 | +j |
| N/D | N/D | A | A | H3 | −j |
| A | N/D | A | A | H3 | −1 |
| N/D | A | A | A | H1 | +1 |
| A | A | A | A | H1 | −1 |

In Table 10, (B0, B1) may be mapped to a 2-bit A/N state for the PCC (or PCell) and (B2, B3) may be mapped to a 2-bit A/N state for the SCC. The fifth columns (resource) of Table 10 show the index of a PUCCH resource selected to transmit the entire 4-bit A/N state (B0, B1, B2 and B3) and the sixth column (constellation) shows a QPSK constellation point on each PUCCH resource. More specifically, an implicit PUCCH resource linked to a PDCCH (i.e. PCC-PDCCH) that schedules the PCC (or PCell) can be allocated to H0 and/or H1 irrespective of whether or not cross CC scheduling is applied and an implicit PUCCH resource linked to a PDCCH (i.e. SCC-PDCCH) that schedules the SCC or an explicit PUCCH resource reserved through RRC can be allocated to H2 and/or H3 according to whether or not cross-CC scheduling is applied. For example, implicit PUCCH resources linked to PCC-PDCCHs respectively having DAI-c values of 1 and 2 can be respectively allocated to H0 and H1 and implicit PUCCH resources linked to SCC-PDCCHs respectively having DAI-c values of 1 and 2 can be respectively allocated to H2 and H3 in a TDD situation.

The above example describes a method of calculating a 2-bit A/N state per CC based on Tables 7, 8 and 9 and then transmitting A/N information through A/N state-to-resource/constellation mapping shown in Table 10. Equivalently, a HARQ-ACK response with respect to each CC can be directly mapped to a finally used PUCCH resource/constellation by skipping the process according to the mapping scheme of Tables 7 to 10.

Table 11 shows Acount-Chsel based A/N mapping when M=2. Table 11 is derived from a combination of Tables 7 and 10. In Table 11, $n^{(1)}_{PUCCH,0}$ to $n^{(1)}_{PUCCH,3}$ correspond to H0 to H3 of Table 10 and bit values [00 11 10 01] correspond to complex symbols [+1 −1 +j −j] of Table 10 (refer to Table 3).

TABLE 11

| PCC (PCell) [B0 B1] HARQ-ACK(0), HARQ-ACK(1) | SCC (SCell) [B2 B3] HARQ-ACK(0), HARQ-ACK(1) | Resource $n_{PUCCH}^{(1)}$ | Constellation b(0), b(1) |
|---|---|---|---|
| A, A | A, A | $n_{PUCCH,1}^{(1)}$ | 1, 1 |
| N/D, A | A, A | $n_{PUCCH,1}^{(1)}$ | 0, 0 |
| A, N/D | A, A | $n_{PUCCH,3}^{(1)}$ | 1, 1 |
| N/D, N/D | A, A | $n_{PUCCH,3}^{(1)}$ | 0, 1 |
| A, A | N/D, A | $n_{PUCCH,0}^{(1)}$ | 1, 0 |
| N/D, A | N/D, A | $n_{PUCCH,3}^{(1)}$ | 1, 0 |

TABLE 11-continued

| PCC (PCell) [B0 B1] HARQ-ACK(0), HARQ-ACK(1) | SCC (SCell) [B2 B3] HARQ-ACK(0), HARQ-ACK(1) | Resource $n_{PUCCH}^{(1)}$ | Constellation b(0), b(1) |
|---|---|---|---|
| A, N/D | N/D, A | $n_{PUCCH,0}^{(1)}$ | 0, 1 |
| N/D, N/D | N/D, A | $n_{PUCCH,3}^{(1)}$ | 0, 0 |
| A, A | A, N/D | $n_{PUCCH,2}^{(1)}$ | 1, 1 |
| N/D, A | A, N/D | $n_{PUCCH,2}^{(1)}$ | 0, 1 |
| A, N/D | A, N/D | $n_{PUCCH,2}^{(1)}$ | 1, 0 |
| N/D, N/D | A, N/D | $n_{PUCCH,2}^{(1)}$ | 0, 0 |
| A, A | N/D, N/D | $n_{PUCCH,1}^{(1)}$ | 1, 0 |
| N/D, A | N/D, N/D | $n_{PUCCH,1}^{(1)}$ | 0, 1 |
| A, N/D | N/D, N/D | $n_{PUCCH,0}^{(1)}$ | 1, 1 |
| N, N/D | N/D, N/D | $n_{PUCCH,0}^{(1)}$ | 0, 0 |
| D, N/D | N/D, N/D | No Transmission | |

Table 12 shows Acount-Chsel based A/N mapping when M=3. Table 12 is derived from a combination of Tables 8 and 10. In Table 12, $n_{PUCCH,0}^{(1)}$ to $n_{PUCCH,3}^{(1)}$ correspond to H0 to H3 of Table 10 and bit values [00 11 10 01] correspond to complex symbols [+1 −1 +j −j] of Table 10 (refer to Table 3).

TABLE 12

| PCC (PCell) [B0 B1] HARQ-ACK(0), HARQ-ACK(1), HARQ-ACK(2) | SCC (SCell) [B2 B3] HARQ-ACK(0), HARQ-ACK(1), HARQ-ACK(2) | Resource $n_{PUCCH}^{(1)}$ | Constellation b(0), b(1) |
|---|---|---|---|
| A, A, A | A, A, A | $n_{PUCCH,1}^{(1)}$ | 1, 1 |
| A, A, N/D | A, A, A | $n_{PUCCH,1}^{(1)}$ | 0, 0 |
| A, N/D, any | A, A, A | $n_{PUCCH,3}^{(1)}$ | 1, 1 |
| N/D, any, any | A, A, A | $n_{PUCCH,3}^{(1)}$ | 0, 1 |
| A, A, A | A, A, N/D | $n_{PUCCH,0}^{(1)}$ | 1, 0 |
| A, A, N/D | A, A, N/D | $n_{PUCCH,3}^{(1)}$ | 1, 0 |
| A, N/D, any | A, A, N/D | $n_{PUCCH,0}^{(1)}$ | 0, 1 |
| N/D, any, any | A, A, N/D | $n_{PUCCH,3}^{(1)}$ | 0, 0 |
| A, A, A | A, N/D, any | $n_{PUCCH,2}^{(1)}$ | 1, 1 |
| A, A, N/D | A, N/D, any | $n_{PUCCH,2}^{(1)}$ | 0, 1 |
| A, N/D, any | A, N/D, any | $n_{PUCCH,2}^{(1)}$ | 1, 0 |
| N/D, any, any | A, N/D, any | $n_{PUCCH,2}^{(1)}$ | 0, 0 |
| A, A, A | N/D, any, any | $n_{PUCCH,1}^{(1)}$ | 1, 0 |
| A, A, N/D | N/D, any, any | $n_{PUCCH,1}^{(1)}$ | 0, 1 |
| A, N/D, any | N/D, any, any | $n_{PUCCH,0}^{(1)}$ | 1, 1 |
| N, any, any | N/D, any, any | $n_{PUCCH,0}^{(1)}$ | 0, 0 |
| D, any, any | N/D, any, any | No Transmission | |

Table 13 shows Acount-Chsel based A/N mapping when M=4. Table 13 is derived from a combination of Tables 9 and 10. In Table 13, $n_{PUCCH,0}^{(1)}$ to $n_{PUCCH,3}^{(1)}$ correspond to H0 to H3 of Table 10 and bit values [00 11 10 01] correspond to complex symbols [+1 −1 +j −j] of Table 10 (refer to Table 3).

TABLE 13

| PCC (PCell) [B0 B1] HARQ-ACK(0), HARQ-ACK(1), HARQ-ACK(2), HARQ-ACK(3) | SCC (SCell) [B2 B3] HARQ-ACK(0), HARQ-ACK(1), HARQ-ACK(2), HARQ-ACK(3) | Resource $n_{PUCCH}^{(1)}$ | Constellation b(0), b(1) |
|---|---|---|---|
| A, A, A, N/D | A, A, A, N/D | $n_{PUCCH,1}^{(1)}$ | 1, 1 |
| A, A, N/D, any | A, A, A, N/D | $n_{PUCCH,1}^{(1)}$ | 0, 0 |
| A, D, D, D | A, A, A, N/D | $n_{PUCCH,3}^{(1)}$ | 1, 1 |
| A, A, A, A | A, A, A, N/D | $n_{PUCCH,3}^{(1)}$ | 1, 1 |
| N/D, any, any, any | A, A, A, N/D | $n_{PUCCH,3}^{(1)}$ | 0, 1 |
| (A, N/D, any, any), except for (A, D, D, D) | A, A, A, N/D | $n_{PUCCH,3}^{(1)}$ | 0, 1 |
| A, A, A, N/D | A, A, N/D, any | $n_{PUCCH,0}^{(1)}$ | 1, 0 |
| A, A, N/D, any | A, A, N/D, any | $n_{PUCCH,3}^{(1)}$ | 1, 0 |
| A, D, D, D | A, A, N/D, any | $n_{PUCCH,0}^{(1)}$ | 0, 1 |
| A, A, A, A | A, A, N/D, any | $n_{PUCCH,0}^{(1)}$ | 0, 1 |
| N/D, any, any, any | A, A, N/D, any | $n_{PUCCH,3}^{(1)}$ | 0, 0 |
| (A, N/D, any, any), except for (A, D, D, D) | A, A, N/D, any | $n_{PUCCH,3}^{(1)}$ | 0, 0 |
| A, A, A, N/D | A, D, D, D | $n_{PUCCH,2}^{(1)}$ | 1, 1 |
| A, A, N/D | A, A, A, A | $n_{PUCCH,2}^{(1)}$ | 1, 1 |
| A, A, N/D, any | A, D, D, D | $n_{PUCCH,2}^{(1)}$ | 0, 1 |
| A, A, N/D, any | A, A, A, A | $n_{PUCCH,2}^{(1)}$ | 0, 1 |
| A, D, D, D | A, D, D, D | $n_{PUCCH,2}^{(1)}$ | 1, 0 |
| A, D, D, D | A, A, A, A | $n_{PUCCH,2}^{(1)}$ | 1, 0 |
| A, A, A, A | A, D, D, D | $n_{PUCCH,2}^{(1)}$ | 1, 0 |
| A, A, A, A | A, A, A, A | $n_{PUCCH,2}^{(1)}$ | 1, 0 |
| N/D, any, any, any | A, D, D, D | $n_{PUCCH,2}^{(1)}$ | 0, 0 |
| N/D, any, any, any | A, A, A, A | $n_{PUCCH,2}^{(1)}$ | 0, 0 |
| (A, N/D, any, any), except for (A, D, D, D) | A, D, D, D | $n_{PUCCH,2}^{(1)}$ | 0, 0 |
| (A, N/D, any, any), except for (A, D, D, D) | A, A, A, A | $n_{PUCCH,2}^{(1)}$ | 0, 0 |
| A, A, A, N/D | N/D, any, any, any | $n_{PUCCH,1}^{(1)}$ | 1, 0 |
| A, A, A, N/D | (A, N/D, any, any), except for (A, D, D, D) | $n_{PUCCH,1}^{(1)}$ | 1, 0 |
| A, A, N/D, any | N/D, any, any, any | $n_{PUCCH,1}^{(1)}$ | 0, 1 |
| A, A, N/D, any | (A, N/D, any, any), except for (A, D, D, D) | $n_{PUCCH,1}^{(1)}$ | 0, 1 |
| A, D, D, D | N/D, any, any, any | $n_{PUCCH,0}^{(1)}$ | 1, 1 |
| A, D, D, D | (A, N/D, any, any), except for (A, D, D, D) | $n_{PUCCH,0}^{(1)}$ | 1, 1 |
| A, A, A, A | N/D, any, any, any | $n_{PUCCH,0}^{(1)}$ | 1, 1 |
| A, A, A, A | (A, N/D, any, any), except for (A, D, D, D) | $n_{PUCCH,0}^{(1)}$ | 1, 1 |
| N, any, any, any | N/D, any, any, any | $n_{PUCCH,0}^{(1)}$ | 0, 0 |
| N, any, any, any | (A, N/D, any, any), except for (A, D, D, D) | $n_{PUCCH,0}^{(1)}$ | 0, 0 |
| (A, N/D, any, any), except for (A, D, D, D) | N/D, any, any, any | $n_{PUCCH,0}^{(1)}$ | 0, 0 |
| (A, N/D, any, any), except for (A, D, D, D) | (A, N/D, any, any), except for (A, D, D, D) | $n_{PUCCH,0}^{(1)}$ | 0, 0 |
| D, any, any, any | N/D, any, any, any | No Transmission | |
| D, any, any, any | (A, N/D, any, any), except for (A, D, D, D) | No Transmission | |

In LTE, when a PUSCH that needs to be transmitted is present at ACK/NACK transmission timing, a UL data payload is punctured (and/or rate-matched) and then corresponding ACK/NACK and UL data are multiplexed and transmitted on the PUSCH instead of a PUCCH (i.e. ACK/

NACK piggybacking). Even in a CA based LTE-A TDD system, when a PUSCH that needs to be transmitted through an ACK/NACK transmission UL subframe or a PUSCH that needs to be transmitted through a PCC in the corresponding UL subframe is present, corresponding ACK/NACK is piggybacked on the PUSCH.

When the perCC-Acount method (i.e. PUCCH format 1b with channel selection) is selected for PUCCH transmission, ACK/NACK piggybacked on a PUSCH can be an ACK-counter value (i.e. per-CC A-counter) per DL CC, which corresponds to the form of ACK/NACK transmitted on a PUCCH. Specifically, in a TDD UL-DL configuration in which DL SF:UL SF=M:1, A/N bits for PUSCH transmission can be generated as follows.

When M=1, a 1-bit or 2-bit A/N response to a PDSCH or DL grant PDCCH (when PDSCH w/o PDCCH is not present) corresponding to DAI-c=1, or a PDSCH w/o PDCCH (when PDSCH w/o PDCCH is present) is generated per CC.

When M=2, 2-bit A/N information is generated per CC using Table 7.

When M=3, 2-bit A/N information is generated per CC using Table 8.

When M=4, 2-bit A/N information is generated per CC using Table 9.

Then, 2-bit A/N responses for respective CCs can be arranged in a contiguous manner to configure a final A/N codeword transmitted on a PUSCH as in the method shown in Table 10. A/N may be assigned to an MSB for a PCC (or PCell). However, the present invention is not limited thereto. Gray coding is preferably applied to 2-bit A/N to minimize the number of A/N response errors when a bit error is generated.

Tables 14, 15 and 16 can be obtained for M=2, M=3 and M=4 by converting A/N states of Tables 7, 8 and 9 into bits (e.g. A→1, N/D→0).

TABLE 14

| HARQ-ACK(0), HARQ-ACK(1) | A/N bit on PUSCH |
|---|---|
| A, A | 1, 1 |
| N/D, A | 0, 1 |
| A, N/D | 1, 0 |
| N/D, N/D | 0, 0 |

Here, HARQ-ACK(0), (1)=(N, N/D) can be mapped to A/N bits (0, 0) and HARQ-ACK(0), (1)=(D, N/D) can be mapped to A/N bits (0, 0).

HARQ-ACK(j) (0≤j≤M−1) (M=2) refers to an ACK/NACK/DTX response to a PDSCH or a DL grant PDCCH (e.g. SPS release PDCCH) transmitted through a (j+1)-th DL SF.

TABLE 15

| HARQ-ACK(0), HARQ-ACK(1), HARQ-ACK(2) | A/N bit on PUSCH |
|---|---|
| A, A, A | 1, 1 |
| A, A, N/D | 0, 1 |
| A, N/D, any | 1, 0 |
| N/D, any, any | 0, 0 |

Here, HARQ-ACK(0), (1), (2)=(N, any, any) can be mapped to A/N bits (0, 0) and HARQ-ACK(0), (1), (2)=(D, any, any) can be mapped to A/N bits (0, 0).

HARQ-ACK(j) (0≤j≤M−1) (M=3) refers to an ACK/NACK/DTX response to a PDSCH or a DL grant PDCCH (e.g. SPS release PDCCH) corresponding to DAI-c=j+1. Equivalently, HARQ-ACK(j) (0≤j≤M−1) (M=3) can refer to an ACK/NACK/DTX response to a PDSCH corresponding to a PDCCH having DAI-c=j+1 or an ACK/NACK/DTX response to an SPS release PDCCH corresponding to DAI-c=j+1. When a PDSCH w/o PDCCH (e.g. SPS PDSCH) is present, HARQ-ACK(0) can refer to an ACK/NACK/DTX response to the PDSCH w/o PDCCH and HARQ-ACK(j) (1≤j≤M−1) can refer to a PDSCH or a DL grant PDCCH (e.g. SPS release PDCCH) corresponding to DAI-c=j. The PDSCH w/o PDCCH can be transmitted on a PCC.

TABLE 16

| HARQ-ACK(0), HARQ-ACK(1), HARQ-ACK(2), HARQ-ACK(3) | A/N bit on PUSCH |
|---|---|
| A, A, A, N/D | 1, 1 |
| A, A, N/D, any | 0, 1 |
| (A, D, D, D) or (A, A, A, A) | 1, 0 |
| (N/D, any, any, any) or (A, N/D, any, any), except for (A, D, D, D) | 0, 0 |

Here, HARQ-ACK(0), (1), (2), (3)=(N, any, any, any) or (A, N/D, any, any) except for (A, D, D, D) can be mapped to A/N bits (0, 0) and HARQ-ACK(0), (1), (2), (3)=(D, any, any, any) can be mapped to A/N bits (0, 0).

HARQ-ACK(j) (0≤j≤M−1) (M=4) refers to an ACK/NACK/DTX response to a PDSCH or a DL grant PDCCH (e.g. SPS release PDCCH) corresponding to DAI-c=j+1. Equivalently, HARQ-ACK(j) (0≤j≤M−1) (M=4) can refer to an ACK/NACK/DTX response to a PDSCH corresponding to a PDCCH having DAI-c=j+1 or an ACK/NACK/DTX response to an SPS release PDCCH corresponding to DAI-c=j+1. When a PDSCH w/o PDCCH (e.g. SPS PDSCH) is present, HARQ-ACK(0) can refer to an ACK/NACK/DTX response to the PDSCH w/o PDCCH and HARQ-ACK(j) (1≤j≤M−1) can refer to a PDSCH or a DL grant PDCCH (e.g. SPS release PDCCH) corresponding to DAI-c=j. The PDSCH w/o PDCCH can be transmitted on a PCC.

When PUSCH ACK/NACK piggybacking is performed, a method of indicating information on ACK/NACK that will be piggybacked on a PUSCH through a PDCCH (i.e. UL grant PDCCH) that schedules the PUSCH can be considered in order to adaptively reduce/determine an ACK/NACK information size.

For example, a maximum value (i.e. maxPDCCHperCC) from among the numbers of PDSCHs or DL grant PDCCHs scheduled/transmitted for respective DL CCs can be indicated through a UL grant PDCCH that schedules a PUSCH. In this case, maxPDCCHperCC can be determined for PDSCHs including or excluding a PDSCH w/o PDCCH (e.g. SPS PDSCH). Specifically, a UE can configure an ACK/NACK payload only for PDSCHs or DL grant PDCCHs and ACK/NACK positions corresponding to DAI-c values (corresponding to numbers up to maxPDCCHperCC−1 when a PDSCH w/o PDCCH (e.g. SPS PDSCH) is present) corresponding to numbers up to maxPDCCHperCC per DL CC. maxPDCCHperCC information can be transmitted through a DAI field (i.e. UL DAI) in the UL grant PDCCH. Even considering a TDD configuration of DL SF:UL SF=9:1 based on 2-bit UL DAI, the following modulo-4 operation is applicable.

UL DAI=1 when maxPDCCHperCC is 1, 5 or 9.
UL DAI=2 when maxPDCCHperCC is 2 or 6.
UL DAI=3 when maxPDCCHperCC is 3 or 7.
UL DAI=4 when maxPDCCHperCC is 0, 4 or 8.

When UL DAI=N (N≤M) is received in a TDD UL-DL configuration in which DL SF:UL SF=M:1, A/N piggybacking using an A/N response-to-A/N state mapping table defined for Acount-Chsel in an N:1, not M:1, TDD UL-DL configuration can be considered. This is described below in detail.

When UL DAI=1 is received, a 1- or 2-bit A/N response to a PDSCH or DL PDCCH (when a PDSCH w/o PDCCH is not present) corresponding to DAI-c=1 or a PDSCH w/o PDCCH (when the PDSCH w/o PDCCH is present) is generated per CC.

When UL DAI=2 is received, 2-bit A/N information is generated per CC using Table 7.

When UL DAI=3 is received, 2-bit A/N information is generated per CC using Table 8.

When UL DAI=4 is received, 2-bit A/N information is generated per CC using Table 9.

Specifically, when UL DAI=1, a 2-bit A/N response for each CW can be generated in a CC configured to transmitted a maximum of 2 CWs, and a 1-bit A/N response can be generated in a CC configured to transmit a maximum of one CW. A final A/N codeword transmitted on a PUSCH can be configured by arranging 1- or 2-bit A/N responses per CC such that the A/N responses are contiguous. A/N for a PCC (or PCell) can be assigned to an MSB (most significant bit). However, the present invention is not limited thereto.

In the case of UL DAI>1, a final A/N codeword transmitted on a PUSCH can be configured by arranging 2-bit A/N responses per CC such that the A/N responses are contiguous in the same manner as the method described with reference to Table 10. A/N for a PCC (or PCell) may be assigned to an MSB. In the case of 2-bit A/N per CC, gray coding capable of reducing the number of A/N response errors when a bit error is generated is preferably applied.

In Tables 14, 15 and 16, A/N bits 0, 1 can be changed to 1, 0 and A/N bits 1, 0 can be changed to 0, 1, and thus gray coding effect can be obtained. Similarly, A/N bits 0, 0 can be changed to 1, 1 and A/N bits 1, 1 can be changed to 0, 0.

Tables 17, 18 and 19 show cases in which A/N bits 0, 1 and 1, 0 in Tables 14, 15 and 16 are changed to 1, 0 and 0, 1.

TABLE 17

| HARQ-ACK(0), HARQ-ACK(1) | A/N bit on PUSCH |
|---|---|
| A, A | 1, 1 |
| N/D, A | 1, 0 |
| A, N/D | 0, 1 |
| N/D, N/D | 0, 0 |

Here, HARQ-ACK(0), (1)=(N, N/D) can be mapped to A/N bits (0, 0) and HARQ-ACK(0), (1)=(D, N/D) can be mapped to A/N bits (0, 0).

HARQ-ACK(j) (0≤j≤M−1) (M=2) refers to an ACK/NACK/DTX response to a PDSCH or a DL grant PDCCH (e.g. SPS release PDCCH) transmitted through a (j+1)-th DL SF.

TABLE 18

| HARQ-ACK(0), HARQ-ACK(1), HARQ-ACK(2) | A/N bit on PUSCH |
|---|---|
| A, A, A | 1, 1 |
| A, A, N/D | 1, 0 |
| A, N/D, any | 0, 1 |
| N/D, any, any | 0, 0 |

Here, HARQ-ACK(0), (1), (2)=(N, any, any) can be mapped to A/N bits (0, 0) and HARQ-ACK(0), (1), (2)=(D, any, any) can be mapped to A/N bits (0, 0).

HARQ-ACK(j) (0≤j≤M−1) (M=3) refers to an ACK/NACK/DTX response to a PDSCH or a DL grant PDCCH (e.g. SPS release PDCCH) corresponding to DAI-c=j+1. Equivalently, HARQ-ACK(j) (0≤j≤M−1) (M=3) can refer to an ACK/NACK/DTX response to a PDSCH corresponding to a PDCCH having DAI-c=j+1 or an ACK/NACK/DTX response to an SPS release PDCCH corresponding to DAI-c=j+1. When a PDSCH w/o PDCCH (e.g. SPS PDSCH) is present, HARQ-ACK(0) can refer to an ACK/NACK/DTX response to the PDSCH w/o PDCCH and HARQ-ACK(j) (1≤j≤M−1) can refer to a PDSCH or a DL grant PDCCH (e.g. SPS release PDCCH) corresponding to DAI-c=j. The PDSCH w/o PDCCH can be transmitted on a PCC.

TABLE 19

| HARQ-ACK(0), HARQ-ACK(1), HARQ-ACK(2), HARQ-ACK(3) | A/N bit on PUSCH |
|---|---|
| A, A, A, N/D | 1, 1 |
| A, A, N/D, any | 1, 0 |
| (A, D, D, D) or (A, A, A, A) | 0, 1 |
| (N/D, any, any, any) or (A, N/D, any, any), except for (A, D, D, D) | 0, 0 |

Here, HARQ-ACK(0), (1), (2), (3)=(N, any, any, any) or (A, N/D, any, any) except for (A, D, D, D) can be mapped to A/N bits (0, 0) and HARQ-ACK(0), (1), (2), (3)=(D, any, any, any) can be mapped to A/N bits (0, 0).

HARQ-ACK(j) (0≤j≤M−1) (M=4) refers to an ACK/NACK/DTX response to a PDSCH or a DL grant PDCCH (e.g. SPS release PDCCH) corresponding to DAI-c=j+1. Equivalently, HARQ-ACK(j) (0≤j≤M−1) (M=4) can refer to an ACK/NACK/DTX response to a PDSCH corresponding to a PDCCH having DAI-c=j+1 or an ACK/NACK/DTX response to an SPS release PDCCH corresponding to DAI-c=j+1. When a PDSCH w/o PDCCH (e.g. SPS PDSCH) is present, HARQ-ACK(0) can refer to an ACK/NACK/DTX response to the PDSCH w/o PDCCH and HARQ-ACK(j) (1≤j≤M−1) can refer to a PDSCH or a DL grant PDCCH (e.g. SPS release PDCCH) corresponding to DAI-c=j. The PDSCH w/o PDCCH can be transmitted on a PCC.

Table 20 is an A/N mapping table when M=2 (Table 14) and two CCs (e.g. PCC and SCC) are configured. A PCC HARQ-ACK set/SCC HARQ-ACK set is mapped to 4-bit A/N according to the mapping relationship of Table 20.

TABLE 20

| PCC (PCell) HARQ-ACK(0), HARQ-ACK(1) | SCC (SCell) HARQ-ACK(0), HARQ-ACK(1) | A/N bits on PUSCH o(0), o(1), o(2), o(3) |
|---|---|---|
| A, A | A, A | 1, 1, 1, 1 |
| N/D, A | A, A | 0, 1, 1, 1 |
| A, N/D | A, A | 1, 0, 1, 1 |
| N/D, N/D | A, A | 0, 0, 1, 1 |
| A, A | N/D, A | 1, 1, 0, 1 |
| N/D, A | N/D, A | 0, 1, 0, 1 |
| A, N/D | N/D, A | 1, 0, 0, 1 |
| N/D, N/D | N/D, A | 0, 0, 0, 1 |
| A, A | A, N/D | 1, 1, 1, 0 |
| N/D, A | A, N/D | 0, 1, 1, 0 |
| A, N/D | A, N/D | 1, 0, 1, 0 |
| N/D, N/D | A, N/D | 0, 0, 1, 0 |
| A, A | N/D, N/D | 1, 1, 0, 0 |
| N/D, A | N/D, N/D | 0, 1, 0, 0 |
| A, N/D | N/D, N/D | 1, 0, 0, 0 |
| N, N/D | N/D, N/D | 0, 0, 0, 0 |
| D, N/D | N/D, N/D | 0, 0, 0, 0 |

Table 21 is a combination of Table 11 and Table 20. Table 21 is applicable to a case in which HARQ-ACK for a plurality of CCs is transmitted through a PUCCH or a PUSCH when M=2 in a CA based TDD communication system.

TABLE 21

| PCC (PCell) HARQ-ACK(0), HARQ-ACK(1) | SCC (SCell) HARQ-ACK(0), HARQ-ACK(1) | Resource $n_{PUCCH}^{(1)}$ | Constellation b(0), b(1) | Bits on PUSCH o(0), o(1), o(2), o(3) |
|---|---|---|---|---|
| A, A | A, A | $n_{PUCCH,1}^{(1)}$ | 1, 1 | 1, 1, 1, 1 |
| N/D, A | A, A | $n_{PUCCH,1}^{(1)}$ | 0, 0 | 0, 1, 1, 1 |
| A, N/D | A, A | $n_{PUCCH,3}^{(1)}$ | 1, 1 | 1, 0, 1, 1 |
| N/D, N/D | A, A | $n_{PUCCH,3}^{(1)}$ | 0, 1 | 0, 0, 1, 1 |
| A, A | N/D, A | $n_{PUCCH,0}^{(1)}$ | 1, 0 | 1, 1, 0, 1 |
| N/D, A | N/D, A | $n_{PUCCH,3}^{(1)}$ | 1, 0 | 0, 1, 0, 1 |
| A, N/D | N/D, A | $n_{PUCCH,3}^{(1)}$ | 0, 1 | 1, 0, 0, 1 |
| N/D, N/D | N/D, A | $n_{PUCCH,3}^{(1)}$ | 0, 0 | 0, 0, 0, 1 |
| A, A | A, N/D | $n_{PUCCH,2}^{(1)}$ | 1, 1 | 1, 1, 1, 0 |
| N/D, A | A, N/D | $n_{PUCCH,2}^{(1)}$ | 0, 1 | 0, 1, 1, 0 |
| A, N/D | A, N/D | $n_{PUCCH,2}^{(1)}$ | 1, 0 | 1, 0, 1, 0 |
| N/D, N/D | A, N/D | $n_{PUCCH,2}^{(1)}$ | 0, 0 | 0, 0, 1, 0 |
| A, A | N/D, N/D | $n_{PUCCH,1}^{(1)}$ | 1, 0 | 1, 1, 0, 0 |
| N/D, A | N/D, N/D | $n_{PUCCH,1}^{(1)}$ | 0, 1 | 0, 1, 0, 0 |
| A, N/D | N/D, N/D | $n_{PUCCH,0}^{(1)}$ | 1, 1 | 1, 0, 0, 0 |
| N, N/D | N/D, N/D | $n_{PUCCH,0}^{(1)}$ | 0, 0 | 0, 0, 0, 0 |
| D, N/D | N/D, N/D | No Transmission | | 0, 0, 0, 0 |

Table 22 is an A/N mapping table when M=3 (Table 18) and two CCs (e.g. PCC and SCC) are configured. A PCC HARQ-ACK set/SCC HARQ-ACK set is mapped to 4-bit A/N according to the mapping relationship of Table 22.

TABLE 22

| PCC (PCell) HARQ-ACK(0), HARQ-ACK(1), HARQ-ACK(2) | SCC (SCell) HARQ-ACK(0), HARQ-ACK(1), HARQ-ACK(2) | A/N bit on PUSCH o(0), o(1), o(2), o(3) |
|---|---|---|
| A, A, A | A, A, A | 1, 1, 1, 1 |
| A, A, N/D | A, A, A | 1, 0, 1, 1 |
| A, N/D, any | A, A, A | 0, 1, 1, 1 |
| N/D, any, any | A, A, A | 0, 0, 1, 1 |
| A, A, A | A, A, N/D | 1, 1, 1, 0 |
| A, A, N/D | A, A, N/D | 1, 0, 1, 0 |
| A, N/D, any | A, A, N/D | 0, 1, 1, 0 |
| N/D, any, any | A, A, N/D | 0, 0, 1, 0 |
| A, A, A | A, N/D, any | 1, 1, 0, 1 |
| A, A, N/D | A, N/D, any | 1, 0, 0, 1 |
| A, N/D, any | A, N/D, any | 0, 1, 0, 1 |
| N/D, any, any | A, N/D, any | 0, 0, 0, 1 |
| A, A, A | N/D, any, any | 1, 1, 0, 0 |
| A, A, N/D | N/D, any, any | 1, 0, 0, 0 |
| A, N/D, any | N/D, any, any | 0, 1, 0, 0 |
| N, any, any | N/D, any, any | 0, 0, 0, 0 |
| D, any, any | N/D, any, any | 0, 0, 0, 0 |

Table 23 is a combination of Table 12 and Table 22. Table 23 is applicable to a case in which HARQ-ACK for a plurality of CCs is transmitted through a PUCCH or a PUSCH when M=3 in a CA based TDD communication system.

TABLE 23

| PCC (PCell) HARQ-ACK(0), HARQ-ACK(1), HARQ-ACK(2) | SCC (SCell) HARQ-ACK(0), HARQ-ACK(1), HARQ-ACK(2) | Resource $n_{PUCCH}^{(1)}$ | Constellation b(0), b(1) | Bits on PUSCH o(0), o(1), o(2), o(3) |
|---|---|---|---|---|
| A, A, A | A, A, A | $n_{PUCCH,1}^{(1)}$ | 1, 1 | 1, 1, 1, 1 |
| A, A, N/D | A, A, A | $n_{PUCCH,1}^{(1)}$ | 0, 0 | 1, 0, 1, 1 |
| A, N/D, any | A, A, A | $n_{PUCCH,3}^{(1)}$ | 1, 1 | 0, 1, 1, 1 |
| N/D, any, any | A, A, A | $n_{PUCCH,3}^{(1)}$ | 0, 1 | 0, 0, 1, 1 |
| A, A, A | A, A, N/D | $n_{PUCCH,0}^{(1)}$ | 1, 0 | 1, 1, 1, 0 |
| A, A, N/D | A, A, N/D | $n_{PUCCH,3}^{(1)}$ | 1, 0 | 1, 0, 1, 0 |
| A, N/D, any | A, A, N/D | $n_{PUCCH,0}^{(1)}$ | 0, 1 | 0, 1, 1, 0 |
| N/D, any, any | A, A, N/D | $n_{PUCCH,3}^{(1)}$ | 0, 0 | 0, 0, 1, 0 |
| A, A, A | A, N/D, any | $n_{PUCCH,2}^{(1)}$ | 1, 1 | 1, 1, 0, 1 |
| A, A, N/D | A, N/D, any | $n_{PUCCH,2}^{(1)}$ | 0, 1 | 1, 0, 0, 1 |
| A, N/D, any | A, N/D, any | $n_{PUCCH,2}^{(1)}$ | 1, 0 | 0, 1, 0, 1 |
| N/D, any, any | A, N/D, any | $n_{PUCCH,2}^{(1)}$ | 0, 0 | 0, 0, 0, 1 |
| A, A, A | N/D, any, any | $n_{PUCCH,1}^{(1)}$ | 1, 0 | 1, 1, 0, 0 |
| A, A, N/D | N/D, any, any | $n_{PUCCH,1}^{(1)}$ | 0, 1 | 1, 0, 0, 0 |
| A, N/D, any | N/D, any, any | $n_{PUCCH,0}^{(1)}$ | 1, 1 | 0, 1, 0, 0 |
| N, any, any | N/D, any, any | $n_{PUCCH,0}^{(1)}$ | 0, 0 | 0, 0, 0, 0 |
| D, any, any | N/D, any, any | No Transmission | | 0, 0, 0, 0 |

Table 24 is an A/N mapping table when M=4 (Table 19) and two CCs (e.g. PCC and SCC) are configured. A PCC HARQ-ACK set/SCC HARQ-ACK set is mapped to 4-bit A/N according to the mapping relationship of Table 24.

TABLE 24

| PCC (PCell) HARQ-ACK(0), HARQ-ACK(1), HARQ-ACK(2), HARQ-ACK(3) | SCC (SCell) HARQ-ACK(0), HARQ-ACK(1), HARQ-ACK(2), HARQ-ACK(3) | A/N bit on PUSCH o(0), o(1), o(2), o(3) |
|---|---|---|
| A, A, A, N/D | A, A, A, N/D | 1, 1, 1, 1 |
| A, A, N/D, any | A, A, A, N/D | 1, 0, 1, 1 |
| A, D, D, D | A, A, A, N/D | 0, 1, 1, 1 |
| A, A, A, A | A, A, A, N/D | 0, 1, 1, 1 |
| N/D, any, any, any | A, A, A, N/D | 0, 0, 1, 1 |
| (A, N/D, any, any), except for (A, D, D, D) | A, A, A, N/D | 0, 0, 1, 1 |
| A, A, A, N/D | A, A, N/D, any | 1, 1, 1, 0 |
| A, A, N/D, any | A, A, N/D, any | 1, 0, 1, 0 |
| A, D, D, D | A, A, N/D, any | 0, 1, 1, 0 |
| A, A, A, A | A, A, N/D, any | 0, 1, 1, 0 |
| N/D, any, any, any | A, A, N/D, any | 0, 0, 1, 0 |
| (A, N/D, any, any), except for (A, D, D, D) | A, A, N/D, any | 0, 0, 1, 0 |
| A, A, A, N/D | A, D, D, D | 1, 1, 0, 1 |
| A, A, A, N/D | A, A, A, A | 1, 1, 0, 1 |
| A, A, N/D, any | A, D, D, D | 1, 0, 0, 1 |
| A, A, N/D, any | A, A, A, A | 1, 0, 0, 1 |
| A, D, D, D | A, D, D, D | 0, 1, 0, 1 |
| A, D, D, D | A, A, A, A | 0, 1, 0, 1 |
| A, A, A, A | A, D, D, D | 0, 1, 0, 1 |
| A, A, A, A | A, A, A, A | 0, 1, 0, 1 |
| N/D, any, any, any | A, D, D, D | 0, 0, 0, 1 |
| N/D, any, any, any | A, A, A, A | 0, 0, 0, 1 |
| (A, N/D, any, any), except for (A, D, D, D) | A, D, D, D | 0, 0, 0, 1 |
| (A, N/D, any, any), except for (A, D, D, D) | A, A, A, A | 0, 0, 0, 1 |
| A, A, A, N/D | N/D, any, any, any | 1, 1, 0, 0 |
| A, A, A, N/D | (A, N/D, any, any), except for (A, D, D, D) | 1, 1, 0, 0 |
| A, A, N/D, any | N/D, any, any, any | 1, 0, 0, 0 |

TABLE 24-continued

| PCC (PCell) HARQ-ACK(0), HARQ-ACK(1), HARQ-ACK(2), HARQ-ACK(3) | SCC (SCell) HARQ-ACK(0), HARQ-ACK(1), HARQ-ACK(2), HARQ-ACK(3) | A/N bit on PUSCH o(0), o(1), o(2), o(3) |
|---|---|---|
| A, A, N/D, any | (A, N/D, any, any), except for (A, D, D, D) | 1, 0, 0, 0 |
| A, D, D, D | N/D, any, any, any | 0, 1, 0, 0 |
| A, D, D, D | (A, N/D, any, any), except for (A, D, D, D) | 0, 1, 0, 0 |
| A, A, A, A | N/D, any, any, any | 0, 1, 0, 0 |
| A, A, A, A | (A, N/D, any, any), except for (A, D, D, D) | 0, 1, 0, 0 |
| N, any, any, any | N/D, any, any, any | 0, 0, 0, 0 |
| N, any, any, any | (A, N/D, any, any), except for (A, D, D, D) | 0, 0, 0, 0 |
| (A, N/D, any, any), except for (A, D, D, D) | N/D, any, any, any | 0, 0, 0, 0 |
| (A, N/D, any, any), except for (A, D, D, D) | (A, N/D, any, any), except for (A, D, D, D) | 0, 0, 0, 0 |
| D, any, any, any | N/D, any, any, any | 0, 0, 0, 0 |
| D, any, any, any | (A, N/D, any, any), except for (A, D, D, D) | 0, 0, 0, 0 |

Table 25 is a combination of Table 13 and Table 24. Table 25 is applicable to a case in which HARQ-ACK for a plurality of CCs is transmitted through a PUCCH or a PUSCH when M=4 in a CA based TDD communication system.

TABLE 25

| PCC (PCell) HARQ-ACK(0), HARQ-ACK(1), HARQ-ACK(2), HARQ-ACK(3) | SCC (SCell) HARQ-ACK(0), HARQ-ACK(1), HARQ-ACK(2), HARQ-ACK(3) | Resource $n_{PUCCH}^{(1)}$ | Constellation b(0), b(1) | Bits on PUSCH o(0), o(1), o(2), o(3) |
|---|---|---|---|---|
| A, A, A, N/D | A, A, A, N/D | $n_{PUCCH,1}^{(1)}$ | 1, 1 | 1, 1, 1, 1 |
| A, A, N/D, any | A, A, A, N/D | $n_{PUCCH,1}^{(1)}$ | 0, 0 | 1, 0, 1, 1 |
| A, D, D, D | A, A, A, N/D | $n_{PUCCH,3}^{(1)}$ | 1, 1 | 0, 1, 1, 1 |
| A, A, A, A | A, A, A, N/D | $n_{PUCCH,3}^{(1)}$ | 1, 1 | 0, 1, 1, 1 |
| N/D, any, any, any | A, A, A, N/D | $n_{PUCCH,3}^{(1)}$ | 0, 1 | 0, 0, 1, 1 |
| (A, N/D, any, any), except for (A, D, D, D) | A, A, A, N/D | $n_{PUCCH,3}^{(1)}$ | 0, 1 | 0, 0, 1, 1 |
| A, A, A, N/D | A, A, N/D, any | $n_{PUCCH,0}^{(1)}$ | 1, 0 | 1, 1, 1, 0 |
| A, A, N/D, any | A, A, N/D, any | $n_{PUCCH,3}^{(1)}$ | 1, 0 | 1, 0, 1, 0 |
| A, D, D, D | A, A, N/D, any | $n_{PUCCH,0}^{(1)}$ | 0, 1 | 0, 1, 1, 0 |
| A, A, A, A | A, A, N/D, any | $n_{PUCCH,0}^{(1)}$ | 0, 1 | 0, 1, 1, 0 |
| N/D, any, any, any | A, A, N/D, any | $n_{PUCCH,3}^{(1)}$ | 0, 0 | 0, 0, 1, 0 |
| (A, N/D, any, any), except for (A, D, D, D) | A, A, N/D, any | $n_{PUCCH,3}^{(1)}$ | 0, 0 | 0, 0, 1, 0 |
| A, A, A, N/D | A, D, D, D | $n_{PUCCH,2}^{(1)}$ | 1, 1 | 1, 1, 0, 1 |
| A, A, N/D, any | A, A, A, A | $n_{PUCCH,2}^{(1)}$ | 1, 1 | 1, 1, 0, 1 |
| A, A, N/D, any | A, D, D, D | $n_{PUCCH,2}^{(1)}$ | 0, 1 | 1, 0, 0, 1 |
| A, A, N/D, any | A, A, A, A | $n_{PUCCH,2}^{(1)}$ | 0, 1 | 1, 0, 0, 1 |
| A, D, D, D | A, D, D, D | $n_{PUCCH,2}^{(1)}$ | 1, 0 | 0, 1, 0, 1 |
| A, D, D, D | A, A, A, A | $n_{PUCCH,2}^{(1)}$ | 1, 0 | 0, 1, 0, 1 |
| A, A, A, A | A, D, D, D | $n_{PUCCH,2}^{(1)}$ | 1, 0 | 0, 1, 0, 1 |

TABLE 25-continued

| PCC (PCell) HARQ-ACK(0), HARQ-ACK(1), HARQ-ACK(2), HARQ-ACK(3) | SCC (SCell) HARQ-ACK(0), HARQ-ACK(1), HARQ-ACK(2), HARQ-ACK(3) | Resource $n_{PUCCH}^{(1)}$ | Constellation b(0), b(1) | Bits on PUSCH o(0), o(1), o(2), o(3) |
|---|---|---|---|---|
| A, A, A, A | A, A, A, A | $n_{PUCCH,2}^{(1)}$ | 1, 0 | 0, 1, 0, 1 |
| N/D, any, any, any | A, D, D, D | $n_{PUCCH,2}^{(1)}$ | 0, 0 | 0, 0, 0, 1 |
| N/D, any, any, any | A, A, A, A | $n_{PUCCH,2}^{(1)}$ | 0, 0 | 0, 0, 0, 1 |
| (A, N/D, any, any), except for (A, D, D, D) | A, D, D, D | $n_{PUCCH,2}^{(1)}$ | 0, 0 | 0, 0, 0, 1 |
| (A, N/D, any, any), except for (A, D, D, D) | A, A, A, A | $n_{PUCCH,2}^{(1)}$ | 0, 0 | 0, 0, 0, 1 |
| A, A, A, N/D | N/D, any, any, any | $n_{PUCCH,1}^{(1)}$ | 1, 0 | 1, 1, 0, 0 |
| A, A, A, N/D | (A, N/D, any, any), except for (A, D, D, D) | $n_{PUCCH,1}^{(1)}$ | 1, 0 | 1, 1, 0, 0 |
| A, A, N/D, any | N/D, any, any, any | $n_{PUCCH,1}^{(1)}$ | 0, 1 | 1, 0, 0, 0 |
| A, A, N/D, any | (A, N/D, any, any), except for (A, D, D, D) | $n_{PUCCH,1}^{(1)}$ | 0, 1 | 1, 0, 0, 0 |
| A, D, D, D | N/D, any, any, any | $n_{PUCCH,0}^{(1)}$ | 1, 1 | 0, 1, 0, 0 |
| A, D, D, D | (A, N/D, any, any), except for (A, D, D, D) | $n_{PUCCH,0}^{(1)}$ | 1, 1 | 0, 1, 0, 0 |
| A, A, A, A | N/D, any, any, any | $n_{PUCCH,0}^{(1)}$ | 1, 1 | 0, 1, 0, 0 |
| A, A, A, A | (A, N/D, any, any), except for (A, D, D, D) | $n_{PUCCH,0}^{(1)}$ | 1, 1 | 0, 1, 0, 0 |
| N, any, any, any | N/D, any, any, any | $n_{PUCCH,0}^{(1)}$ | 0, 0 | 0, 0, 0, 0 |
| N, any, any, any | (A, N/D, any, any), except for (A, D, D, D) | $n_{PUCCH,0}^{(1)}$ | 0, 0 | 0, 0, 0, 0 |
| (A, N/D, any, any), except for (A, D, D, D) | N/D, any, any, any | $n_{PUCCH,0}^{(1)}$ | 0, 0 | 0, 0, 0, 0 |
| (A, N/D, any, any), except for (A, D, D, D) | (A, N/D, any, any), except for (A, D, D, D) | $n_{PUCCH,0}^{(1)}$ | 0, 0 | 0, 0, 0, 0 |
| D, any, any, any | N/D, any, any, any | No Transmission | | 0, 0, 0, 0 |
| D, any, any, any | (A, N/D, any, any), except for (A, D, D, D) | No Transmission | | 0, 0, 0, 0 |

Figure 13:
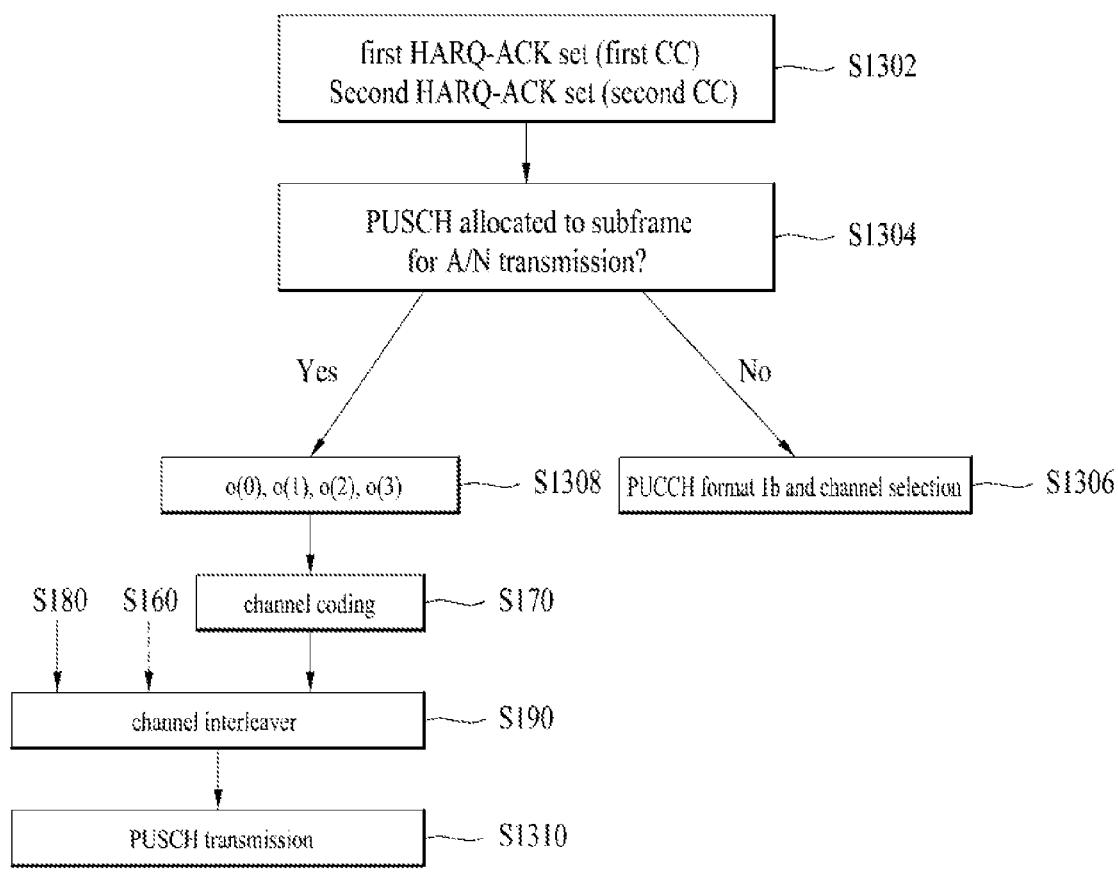
FIG. 13 illustrates an A/N transmission procedure according to an embodiment of the present invention.

FIG. 13 illustrates an A/N transmission procedure according to an embodiment of the present invention.

Referring to FIG. 13, a UE generates a first HARQ-ACK set for a first CC (or cell) and a second HARQ-ACK set for a second CC (or cell) (S1302). Then, the UE checks whether a PUSCH is allocated to a subframe (referred to as an A/N subframe) for A/N transmission (S1304). When no PUSCH is allocated to the A/N subframe, the UE transmits A/N information using PUCCH format 1b and channel selection. In this case, PUCCH resources and A/N bits according to PUCCH format 1b and channel selection can be transmitted using Tables 11, 12 and 13 (or Tables 21, 23 and 25). On the contrary, when a PUSCH is allocated to the A/N subframe, the UE multiplexes A/N bits in the PUSCH. Specifically, the UE generates 4-bit A/N o(0), o(1), o(2), o(3) corresponding to the first HARQ-ACK set and the second HARQ-ACK set (S1308). The 4-bit A/N can be obtained based on Tables 20, 22 and 24 (or Tables 21, 23 and 25). The 4-bit A/N passes through a channel coding block (S170) (refer to FIG. 8) and a channel interleaver block (S190) (refer to FIG. 8) and is transmitted through the PUSCH. Output bits of a data and control multiplexing block (S180) (refer to FIG. 8) and output bits of a channel coding block (S160) for an RI (refer to FIG. 8) are input to the channel interleaver block (S190). The RI is selectively present.

Channel coding (S170) may be performed using a Reed-Muller (RM) code, Tail-biting convolutional code, etc. When the RM code is used, the 4-bit A/N o(0), o(1), o(2), o(3) can be channel-coded using the following Equation.

$$q_i^{ACK} = \sum_{n=0}^{3} (o_n \cdot M_{(i \bmod 32),n}) \bmod 2 \qquad \text{[Equation 3]}$$

Here, $q_i^{ACK}$ denotes an i-th channel-coded bit, i denotes an integer equal to or greater than 0, specifically an integer in the range of 0 to $Q_{ACK_{-1}}$, and $Q_{ACK}$ represents the total number of channel-coded bits. In addition, mod represents a modulo operation and $M_{a,n}$ represents the following block code.

TABLE 26

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Figure 14:
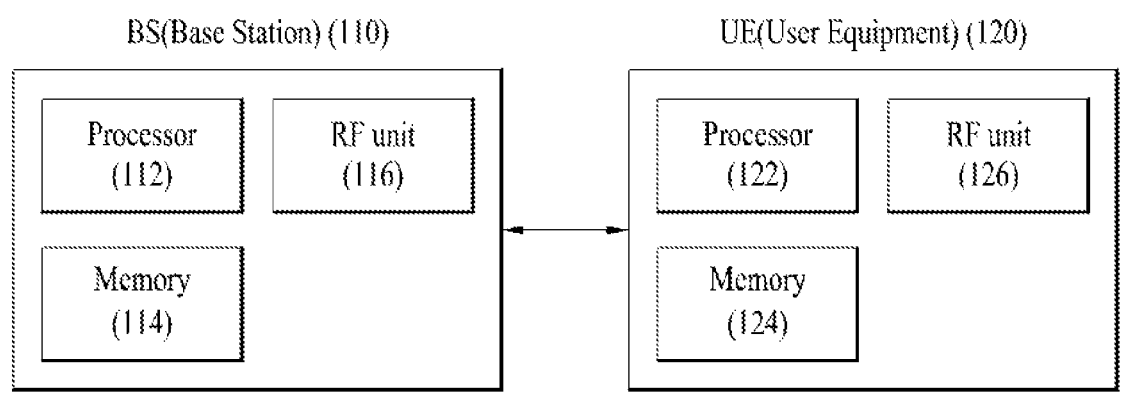
FIG. 14 illustrates a base station (BS) and UE applicable to embodiments of the present invention.

FIG. 14 illustrates a BS and UE applicable to embodiments of the present invention. In the case of a system including a relay, the BS or UE can be replaced by the relay.

Referring to FIG. 14, a wireless communication system includes a BS 110 and a UE 120. The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to wireless communication devices such as a UE, a relay, a BS, etc.

What is claimed is:

1. A method for transmitting uplink control information in a wireless communication system supporting carrier aggregation and operating in Time Division Duplex (TDD), the method comprising:
   transmitting 4 bits (o(0), o(1), o(2), o(3)) for hybrid automatic repeat request acknowledgements (HARQ-ACKs) on a physical uplink shared channel (PUSCH), wherein the 4 bits correspond to a first set of HARQ-ACKs associated with a first component carrier (CC) and a second set of HARQ-ACKs associated with a second CC according to a relation including the following table:

| First Set of HARQ-ACKs | Second Set of HARQ-ACKs | o(0), o(1), o(2), o(3) |
|---|---|---|
| A, A, A | A, A, A | 1, 1, 1, 1 |
| A, A, N/D | A, A, A | 1, 0, 1, 1 |
| A, N/D, any | A, A, A | 0, 1, 1, 1 |
| N/D, any, any | A, A, A | 0, 0, 1, 1 |
| A, A, A | A, A, N/D | 1, 1, 1, 0 |
| A, A, N/D | A, A, N/D | 1, 0, 1, 0 |
| A, N/D, any | A, A, N/D | 0, 1, 1, 0 |
| N/D, any, any | A, A, N/D | 0, 0, 1, 0 |
| A, A, A | A, N/D, any | 1, 1, 0, 1 |
| A, A, N/D | A, N/D, any | 1, 0, 0, 1 |
| A, N/D, any | A, N/D, any | 0, 1, 0, 1 |
| N/D, any, any | A, N/D, any | 0, 0, 0, 1 |
| A, A, A | N/D, any, any | 1, 1, 0, 0 |
| A, A, N/D | N/D, any, any | 1, 0, 0, 0 |
| A, N/D, any | N/D, any, any | 0, 1, 0, 0 |
| N, any, any | N/D, any, any | 0, 0, 0, 0 |
| D, any, any | N/D, any, any | 0, 0, 0, 0. | wherein A denotes ACK, N denotes negative ACK (NACK), D denotes discontinuous transmission (DTX), N/D denotes NACK or DTX, and any represents one of ACK, NACK and DTX.

2. The method according to claim 1, wherein the first set of HARQ-ACKs comprises HARQ-ACK(0), HARQ-ACK(1) and HARQ-ACK(2) associated with the first CC, and the second set of HARQ-ACKs comprises HARQ-ACK(0), HARQ-ACK(1) and HARQ-ACK(2) associated with the second CC.

3. The method according to claim 2, wherein when a physical downlink shared channel (PDSCH) without a corresponding physical downlink control channel (PDCCH) is detected in the first CC or the second CC, HARQ-ACK(0) refers to an ACK/NACK/DTX response to the PDSCH without PDCCH, and HARQ-ACK (j) (1≤j≤2) in the corresponding HARQ-ACK set represents an ACK/NACK/DTX response to a PDSCH corresponding to a PDCCH having a downlink assignment index (DAI) of j or an ACK/NACK/DTX response to an semi-persistent scheduling (SPS) release PDCCH having a DAI of j.

4. The method according to claim 2, wherein when a physical downlink shared channel (PDSCH) without a corresponding physical downlink control channel (PDCCH) is not detected in the first CC or the second CC, HARQ-ACK (j) (0≤j≤2) in the corresponding HARQ-ACK set represents an ACK/NACK/DTX response to a PDSCH corresponding to a PDCCH having a downlink assignment index (DAI) of j+1 or an ACK/NACK/DTX response to an semi-persistent scheduling (SPS) release PDCCH having a DAI of j+1.

5. The method according to claim 1, wherein the first CC is a primary CC and the second CC is a secondary CC.

6. The method according to claim 1, wherein the transmitting the 4 bits comprises channel-coding the 4 bits using Equation A:

$$q_i^{ACK} = \sum_{n=0}^{3} (o_n \cdot M_{(i \bmod 32),n}) \bmod 2, \quad \text{[Equation A]}$$

wherein $q_i^{ACK}$ denotes an i-th channel-coded bit, i denotes an integer equal to or greater than 0, mod represents a modulo operation, and $M_{(i \bmod 32),n}$ represents the following block code:

| i | $M_{i,0}$ | $M_{i,1}$ | $M_{i,2}$ | $M_{i,3}$ |
|---|---|---|---|---|
| 0 | 1 | 1 | 0 | 0 |
| 1 | 1 | 1 | 1 | 0 |
| 2 | 1 | 0 | 0 | 1 |
| 3 | 1 | 0 | 1 | 1 |
| 4 | 1 | 1 | 1 | 1 |
| 5 | 1 | 1 | 0 | 0 |
| 6 | 1 | 0 | 1 | 0 |
| 7 | 1 | 0 | 0 | 1 |
| 8 | 1 | 1 | 0 | 1 |
| 9 | 1 | 0 | 1 | 1 |
| 10 | 1 | 0 | 1 | 0 |
| 11 | 1 | 1 | 1 | 0 |
| 12 | 1 | 0 | 0 | 1 |
| 13 | 1 | 1 | 0 | 1 |
| 14 | 1 | 0 | 0 | 0 |
| 15 | 1 | 1 | 0 | 0 |
| 16 | 1 | 1 | 1 | 0 |
| 17 | 1 | 0 | 0 | 1 |
| 18 | 1 | 1 | 0 | 1 |
| 19 | 1 | 0 | 0 | 0 |
| 20 | 1 | 0 | 1 | 0 |
| 21 | 1 | 1 | 0 | 1 |
| 22 | 1 | 0 | 0 | 0 |
| 23 | 1 | 1 | 1 | 0 |

| i | $M_{i,0}$ | $M_{i,1}$ | $M_{i,2}$ | $M_{i,3}$ |
|---|---|---|---|---|
| 24 | 1 | 1 | 1 | 1 |
| 25 | 1 | 1 | 0 | 0 |
| 26 | 1 | 0 | 1 | 1 |
| 27 | 1 | 1 | 1 | 1 |
| 28 | 1 | 0 | 1 | 0 |
| 29 | 1 | 0 | 1 | 1 |
| 30 | 1 | 1 | 1 | 1 |
| 31 | 1 | 0 | 0 | 0. |

7. A communication device configured to transmit uplink control information in a wireless communication system supporting carrier aggregation and operating in Time Division Duplex (TDD), the communication device comprising:
a radio frequency (RF) unit configured to transmit 4 bits (o(0), o(1), o(2), o(3)) for hybrid automatic repeat request acknowledgements (HARQ-ACKs) on a physical uplink shared channel (PUSCH),
wherein the 4 bits correspond to a first set of HARQ-ACKs associated with a first component carrier (CC) and a second set of HARQ-ACKs associated with a second CC according to a relation including the following table:

| First Set of HARQ-ACKs | Second Set of HARQ-ACKs | o(0), o(1), o(2), o(3) |
|---|---|---|
| A, A, A | A, A, A | 1, 1, 1, 1 |
| A, A, N/D | A, A, A | 1, 0, 1, 1 |
| A, N/D, any | A, A, A | 0, 1, 1, 1 |
| N/D, any, any | A, A, A | 0, 0, 1, 1 |
| A, A, A | A, A, N/D | 1, 1, 1, 0 |
| A, A, N/D | A, A, N/D | 1, 0, 1, 0 |
| A, N/D, any | A, A, N/D | 0, 1, 1, 0 |
| N/D, any, any | A, A, N/D | 0, 0, 1, 0 |
| A, A, A | A, N/D, any | 1, 1, 0, 1 |
| A, A, N/D | A, N/D, any | 1, 0, 0, 1 |
| A, N/D, any | A, N/D, any | 0, 1, 0, 1 |
| N/D, any, any | A, N/D, any | 0, 0, 0, 1 |
| A, A, A | N/D, any, any | 1, 1, 0, 0 |
| A, A, N/D | N/D, any, any | 1, 0, 0, 0 |
| A, N/D, any | N/D, any, any | 0, 1, 0, 0 |
| N, any, any | N/D, any, any | 0, 0, 0, 0 |
| D, any, any | N/D, any, any | 0, 0, 0, 0, | wherein A denotes ACK, N denotes negative ACK (NACK), D denotes discontinuous transmission (DTX), N/D denotes NACK or DTX, and any represents one of ACK, NACK and DTX.

8. The communication device according to claim 7, wherein the first set of HARQ-ACKs comprises HARQ-ACK(0), HARQ-ACK(1) and HARQ-ACK(2) associated with the first CC, and the second set of HARQ-ACKs comprises HARQ-ACK(0), HARQ-ACK(1) and HARQ-ACK(2) associated with the second CC.

9. The communication device according to claim 8, wherein when a physical downlink shared channel (PDSCH) without a corresponding physical downlink control channel (PDCCH) is detected in the first CC or the second CC, HARQ-ACK(0) refers to an ACK/NACK/DTX response to the PDSCH without PDCCH, and HARQ-ACK (j) (1≤j≤2) in the corresponding HARQ-ACK set represents an ACK/NACK/DTX response to a PDSCH corresponding to a PDCCH having a downlink assignment index (DAI) of j or an ACK/NACK/DTX response to an semi-persistent scheduling (SPS) release PDCCH having a DAI of j.

10. The communication device according to claim 8, wherein when a physical downlink shared channel (PDSCH) without a corresponding physical downlink control channel (PDCCH) is not detected in the first CC or the second CC, HARQ-ACK(j) (0≤j≤2) in the corresponding HARQ-ACK set represents an ACK/NACK/DTX response to a PDSCH corresponding to a PDCCH having a downlink assignment index (DAI) of j+1 or an ACK/NACK/DTX response to an semi-persistent scheduling (SPS) release PDCCH having a DAI of j+1.

11. The communication device according to claim 7, wherein the first CC is a primary CC and the second CC is a secondary CC.

12. The communication device according to claim 7, wherein the RF unit transmits the 4 bits by channel-coding the 4 bits using Equation A:

$$q_i^{ACK} = \sum_{n=0}^{3} (o_n \cdot M_{(i\,mod\,32),n}) \bmod 2, \qquad [\text{Equation A}]$$

wherein $q_i^{ACK}$ denotes an i-th channel-coded bit, i denotes an integer equal to or greater than 0, mod represents a modulo operation, and $M_{(i\,mod\,32),n}$ represents the following block code:

| I | $M_{i,0}$ | $M_{i,1}$ | $M_{i,2}$ | $M_{i,3}$ |
|---|---|---|---|---|
| 0 | 1 | 1 | 0 | 0 |
| 1 | 1 | 1 | 1 | 0 |
| 2 | 1 | 0 | 0 | 1 |
| 3 | 1 | 0 | 1 | 1 |
| 4 | 1 | 1 | 1 | 1 |
| 5 | 1 | 1 | 0 | 0 |
| 6 | 1 | 0 | 1 | 0 |
| 7 | 1 | 0 | 0 | 1 |
| 8 | 1 | 1 | 0 | 1 |
| 9 | 1 | 0 | 1 | 1 |
| 10 | 1 | 0 | 1 | 0 |
| 11 | 1 | 1 | 1 | 0 |
| 12 | 1 | 0 | 0 | 1 |
| 13 | 1 | 1 | 0 | 1 |
| 14 | 1 | 0 | 0 | 0 |
| 15 | 1 | 1 | 0 | 0 |
| 16 | 1 | 1 | 1 | 0 |
| 17 | 1 | 0 | 0 | 1 |
| 18 | 1 | 1 | 0 | 1 |
| 19 | 1 | 0 | 0 | 0 |
| 20 | 1 | 0 | 1 | 0 |
| 21 | 1 | 1 | 0 | 1 |
| 22 | 1 | 0 | 0 | 0 |
| 23 | 1 | 1 | 1 | 0 |
| 24 | 1 | 1 | 1 | 1 |
| 25 | 1 | 1 | 0 | 0 |
| 26 | 1 | 0 | 1 | 1 |
| 27 | 1 | 1 | 1 | 1 |
| 28 | 1 | 0 | 1 | 0 |
| 29 | 1 | 0 | 1 | 1 |
| 30 | 1 | 1 | 1 | 1 |
| 31 | 1 | 0 | 0 | 0. |

* * * * *